US012732981B2

(12) United States Patent
Yum et al.

(10) Patent No.: US 12,732,981 B2
(45) Date of Patent: Sep. 8, 2026

(54) USER EQUIPMENT INCLUDING PLURALITY OF ANTENNA PANELS AND COMMUNICATION SYSTEM INCLUDING THE SAME

(71) Applicant: SAMSUNG ELECTRONICS CO., LTD., Suwon-si (KR)

(72) Inventors: Kunil Yum, Seoul (KR); Yangsoo Kwon, Seoul (KR); Jungmin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 976 days.

(21) Appl. No.: 17/842,305

(22) Filed: Jun. 16, 2022

(65) Prior Publication Data

US 2022/0408425 A1 Dec. 22, 2022

(30) Foreign Application Priority Data

Jun. 17, 2021 (KR) ........................ 10-2021-0078857
Nov. 3, 2021 (KR) ........................ 10-2021-0149950

(51) Int. Cl.
*H04W 72/044* (2023.01)
*H04B 7/0413* (2017.01)
*H04B 7/06* (2006.01)

(52) U.S. Cl.
CPC ........ *H04W 72/046* (2013.01); *H04B 7/0413* (2013.01); *H04B 7/06956* (2023.05)

(58) Field of Classification Search
CPC ........................... H04W 72/046; H04B 7/0413
See application file for complete search history.

(56) References Cited

U.S. PATENT DOCUMENTS 10,536,205 B2 1/2020 Rahman et al.
10,715,241 B2 7/2020 Islam et al.
10,742,303 B1 8/2020 Nilsson
10,797,810 B2 10/2020 Ghanbarinejad et al.
10,887,884 B2 1/2021 Onggosanusi et al.
10,958,327 B2 3/2021 Rahman et al.
10,972,972 B2 4/2021 Cheng et al.
(Continued)

FOREIGN PATENT DOCUMENTS

CN 112399465 A 2/2021
EP 4017176 A1 6/2022
(Continued)

OTHER PUBLICATIONS

European Search Report, dated Nov. 9, 2022, issued by the European Patent Office, in App No. 22179571.9.
(Continued)

*Primary Examiner* — Charles C Jiang
(74) *Attorney, Agent, or Firm* — Sughrue Mion, PLLC

(57) ABSTRACT

User equipment configured to communicate with a device includes a first antenna panel, a second antenna panel, and a controller configured to control the first antenna panel and the second antenna panel, wherein the controller is configured to perform an uplink panel change for turning on the second antenna panel to change a first transmission beam of the first antenna panel, which is on, to a second transmission beam of the second antenna panel, which is off, according to uplink panel change-related signaling with the device.

18 Claims, 25 Drawing Sheets

(56) References Cited

U.S. PATENT DOCUMENTS

| | | | | |
|---|---|---|---|---|
| 11,006,429 | B2 | 5/2021 | Davydov et al. | |
| 11,038,566 | B2 | 6/2021 | Faxér et al. | |
| 2015/0181589 | A1* | 6/2015 | Luo | H04L 5/0073 370/329 |
| 2019/0181932 | A1* | 6/2019 | Jayawardene | H04W 72/046 |
| 2021/0160964 | A1* | 5/2021 | Sun | H04B 7/0626 |
| 2021/0259018 | A1* | 8/2021 | Hosseini | H04W 72/0453 |
| 2022/0159593 | A1* | 5/2022 | Jeon | H04W 76/20 |
| 2022/0174719 | A1* | 6/2022 | Zhang | H04W 52/0245 |
| 2022/0232546 | A1* | 7/2022 | Hakola | H04W 24/08 |
| 2022/0295322 | A1* | 9/2022 | Haghighat | H04B 7/0404 |
| 2022/0304035 | A1* | 9/2022 | Zhang | H04B 7/0408 |
| 2023/0361946 | A1* | 11/2023 | Li | H04B 7/0404 |
| 2024/0007149 | A1* | 1/2024 | Yuan | H04B 7/0404 |

FOREIGN PATENT DOCUMENTS

| | | | |
|---|---|---|---|
| WO | 2020-072893 | A1 | 4/2020 |
| WO | 2020-213977 | A1 | 10/2020 |
| WO | 2020/229976 | A1 | 11/2020 |
| WO | 2021/030605 | A1 | 2/2021 |
| WO | 2021-031812 | A1 | 2/2021 |

OTHER PUBLICATIONS

Communication issued on Dec. 18, 2025 by the Korean Ministry of Intellectual Property (MOIP) in Korean Patent Application No. 10-2021-0149950.

* cited by examiner

A1: PANEL MAINTAINED

B1: PANEL CHANGED

A2: PANEL MAINTAINED

B2: PANEL CHANGED

2000
HOME GADGET
2100
2120
HOME APPLIANCES
2200
ACCESS POINT
2250
2300
2400
SERVER
2140
ENTERTAINMENT
2160
VEHICLE

USER EQUIPMENT INCLUDING PLURALITY OF ANTENNA PANELS AND COMMUNICATION SYSTEM INCLUDING THE SAME

CROSS-REFERENCE TO RELATED APPLICATIONS

This application is based on and claims priority under 35 U.S.C. § 119 to Korean Patent Application No. 10-2021-0078857, filed on Jun. 17, 2021, and Korean Patent Application No. 10-2021-0149950, filed on Nov. 3, 2021, in the Korean Intellectual Property Office, the disclosures of which are incorporated by reference herein in their entireties.

BACKGROUND

Embodiments relate to wireless communication, and more particularly, to user equipment including a plurality of antenna panels and a communication system including the user equipment.

A method of changing beams by using Downlink Control Information (DCI) and the like is under discussion to expand beam management according to third-generation partnership project (3GPP) New Radio (NR) standards. When user equipment includes a plurality of antenna panels but it is impossible to use the antenna panels at the same time, the user equipment may turn off an antenna panel, which is currently selected, during an antenna panel change (or switching) and turn on another antenna panel. During such an antenna panel change, a gap indicating temporary communication failure may occur in the user equipment. Because of a communication disabled state according to the antenna panel change, the communication performance of the user equipment may be negatively influenced. Thus, communication techniques are required to overcome such bad effects.

SUMMARY

Embodiments provide user equipment for securing stable communication performance when an uplink panel change is performed by the user equipment, a communication system including the user equipment, and an operation method of the user equipment.

Provided herein is a user equipment configured to communicate with a device, the user equipment including a first antenna panel, a second antenna panel, and a controller configured to control the first antenna panel and the second antenna panel, wherein the controller is configured to perform an uplink panel change for turning on the second antenna panel to change a first transmission beam of the first antenna panel, which is on, to a second transmission beam of the second antenna panel, which is off, according to uplink panel change-related signaling with the device.

Also provided herein is a communication system including user equipment comprising a plurality of antenna panels, and a device configured to communicate with the user equipment, wherein the user equipment is configured to perform uplink panel change-related signaling with the device, and perform an uplink panel change for turning on at least one second antenna panel to change at least one first antenna panel, which is on from among the plurality of antenna panels, to the at least one second antenna panel, which is off from among the plurality of antenna panels, based on the uplink panel change-related signaling.

Also provided herein is an operation method of user equipment configured to communicate with a device by selectively using at least one of a plurality of antenna panels, the operation method including performing uplink panel change-related signaling with the device, and performing an uplink panel change for turning on at least one second antenna panel, which is off from among the plurality of antenna panels, to change at least one first antenna panel, which is on from among the plurality of antenna panels, to the at least one second antenna panel, based on the uplink panel change-related signaling.

BRIEF DESCRIPTION OF DRAWINGS

Embodiments will be more clearly understood from the following detailed description taken in conjunction with the accompanying drawings in which.

DETAILED DESCRIPTION OF EMBODIMENTS

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
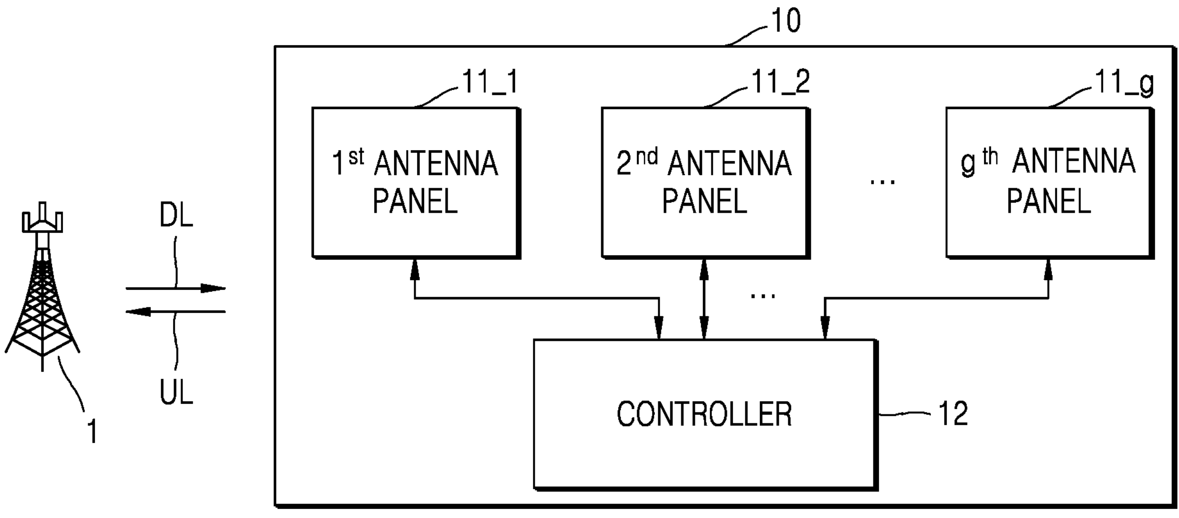
FIG. 1 is a block diagram of a wireless communication system according to an example embodiment.

FIG. 1 is a block diagram of a wireless communication system according to an example embodiment. As a non-limiting example, the wireless communication system may be a wireless communication system, for example, a $5^{th}$ generation wireless (5G) system, a Long Term Evolution (LTE) system, an LTE-Advanced system, a Code Division Multiple Access (CDMA) system, or a Global System for Mobile Communications (GSM) system, which uses a cellular network, may be a Wireless Personal Area Network (WPAN) system, or another arbitrary wireless communication system. Hereinafter, the wireless communication system is described by mainly referencing a wireless communication system using a cellular network, but it would be understood that one or more embodiments are not limited thereto.

A base station (BS) 1 may generally indicate a fixed station communicating with user equipment and/or another BS and may exchange data and control information by communicating with the user equipment and/or the other BS. For example, the BS 1 may be referred to as a Node B, an evolved-Node B (eNB), a Next-generation Node B (gNB), a sector, a site, a Base Transceiver System (BTS), an Access point (AP), a Relay Node, a Remote Radio Head (RRH), a Radio Unit (RU), a small cell, a device, or the like. In the present embodiment, a BS or a cell may be interpreted in a broad sense, which indicates some regions or functions covered by a BS Controller (BSC) in Code Division Multiple Access (CDMA), Node-B in Wideband Code Division Multiple Access (WCDMA), an eNB in LTE, a gNB or a sector (a site) in 5G, or the like, and may include various coverage areas such as a mega cell, a macro-cell, a micro-cell, a picocell, a femtocell and a relay node, an RRH, an RU, and a small cell communication range.

User equipment (UE) 10 may be fixed or movable and may denote arbitrary devices capable of receiving/transmitting data and/or control information by communicating with a BS, for example, the BS 1. For example, the UE 10 may be referred to as a terminal, terminal equipment, a Mobile Station (MS), a Mobile Terminal (MT), a User Terminal (UT), a Subscriber Station (SS), a wireless communication device, a wireless device, a handheld device, or the like. Hereinafter, one or more example embodiments are described by mainly referencing the UE 10 as a wireless communication device, but are not limited thereto.

A wireless communication network between the UE 10 and the BS 1 may share available network resources and thus may support communication between multiple users. For example, in the wireless communication network, information may be transmitted according to various multiple access methods such as CDMA, Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA. As illustrated in FIG. 1, the UE 10 may communicate with the BS 1 through an uplink UL and a downlink DL. In some embodiments, user devices may communicate with each other through a sidelink like in Device-to-Device (D2D) communication, and in this case, the idea may be applied.

Referring to FIG. 1, the UE 10 may include first to $g^{th}$ (where, g is an integer equal to or greater than 2) antenna panels 11_1 to 11_*g* and a controller 12. In the present embodiment, an antenna panel may be referred to as a panel, and when the UE 10 transmits an uplink signal, an antenna panel may be referred to as an uplink panel.

In an example embodiment, each of the first to $g^{th}$ antenna panels 11_1 to 11_*g* may include a plurality of antenna elements. In some embodiments, each of the first to $g^{th}$ antenna panels 11_1 to 11_*g* may include a plurality of antenna arrays including antenna elements. An antenna array may be referred to as a phased array. In an example embodiment, the first to $g^{th}$ antenna panels 11_1 to 11_*g* may be apart from each other and respectively arranged in regions where the first to $g^{th}$ antenna panels 11_1 to 11_*g* may provide optimum communication performance, and the first to $g^{th}$ antenna panels 11_1 to 11_*g* may be individually packaged.

In an example embodiment, the controller 12 may control all communication operations of the UE 10. For example, the controller 12 may control turning on/off of the first to $g^{th}$ antenna panels 11_1 to 11_*g*, forming a transmission beam or a reception beam by using at least one antenna panel that is turned on, and communicate with the BS 1 by using the formed transmission beam or reception beam. Depending on implementation examples of the UE 10, all of the first to $g^{th}$ antenna panels 11_1 to 11_*g* may be turned on and used for communication, or some of the first to $g^{th}$ antenna panels 11_1 to 11_*g* are turned on and the others thereof are turned off, and thus, at least one of the first to $g^{th}$ antenna panels 11_1 to 11_*g* that is turned on may be used for communication.

While communicating with the BS 1 by using the first to $g^{th}$ antenna panels 11_1 to 11_*g*, the UE 10 may need to perform an operation of changing an antenna panel according to an implementation example or various cases such as a beam change. In the present embodiment, an antenna panel change is an operation in which an antenna panel, which is previously selected and forms a beam, is changed to another antenna panel to form a new beam, and may be defined as further including an operation of turning on another antenna panel having been off. In some embodiments, the antenna panel change may further include an operation of turning off an antenna panel that is previously selected and forms a beam, but it may not be required. That is, the UE 10 may selectively turn off antenna panels that are on but not used.

For example, when the first to $g^{th}$ antenna panels 11_1 to 11_*g* are configured to be simultaneously turned on and used for communication, the antenna panel change of the UE 10 may not be required; however, when only some of the first to $g^{th}$ antenna panels 11_1 to 11_*g* are configured to be turned on and used for communication, the antenna panel change of the UE 10 may be required. When the UE 10 performs the antenna panel change, a blank period of antenna panels may be generated so that an antenna panel is changed to a target antenna panel, and the blank period may cause degradation of the communication performance of the UE 10. In the present specification, the blank period may be referred to as a gap or an antenna panel change gap.

Embodiments relate to signaling, which is pre-arranged between the UE 10 and the BS 1 to decrease the degradation of the communication performance caused by a gap generated when the antenna panel change of the UE 10 is performed, and an antenna panel change performed according to the signaling. Embodiments may be defined according to the standard specification of NR-related Release-17 distributed by the 3rd Generation Partnership Project (3GPP). However, this is merely an example, and one or more embodiments are not limited thereto. Embodiments may be applied to communication networks other than the NR.

In an example embodiment, the controller 12 may perform an antenna panel change based on antenna panel change-related signaling with the BS 1. Hereinafter, an embodiment, in which the UE 10 performs the antenna panel change to effectively transmit an uplink signal to the BS 1, is mainly described, and in this case, an antenna panel may be referred to as an uplink panel, and an antenna panel change may be referred to as an uplink panel change.

In an example embodiment, the controller 12 may include a hardware block designed through logical synthesis and include a processing block including a software module including a series of instructions and a processor executing the software module. The controller 12 may be referred to as a communication processor, a baseband processor, a modem, or the like.

The UE 10 may perform signaling pre-arranged with the BS 1 and an uplink panel change on the first to $g^{th}$ antenna panels 11_1 to 11_g, thereby decreasing the degradation of the communication performance caused by a gap generated during the uplink panel change.

Figure 2A:
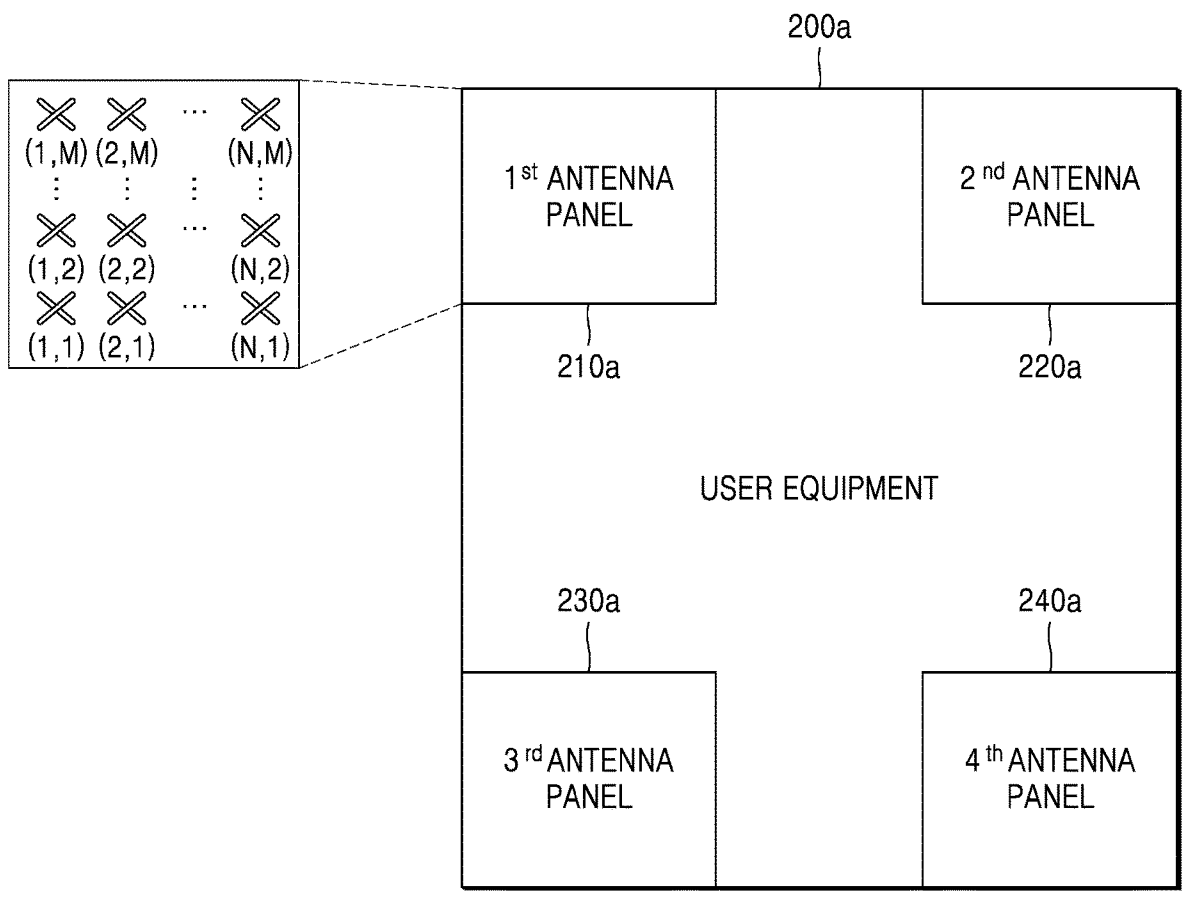
FIGS. 2A and 2B are block diagrams of user equipment according to an example embodiment.
Figure 2B:
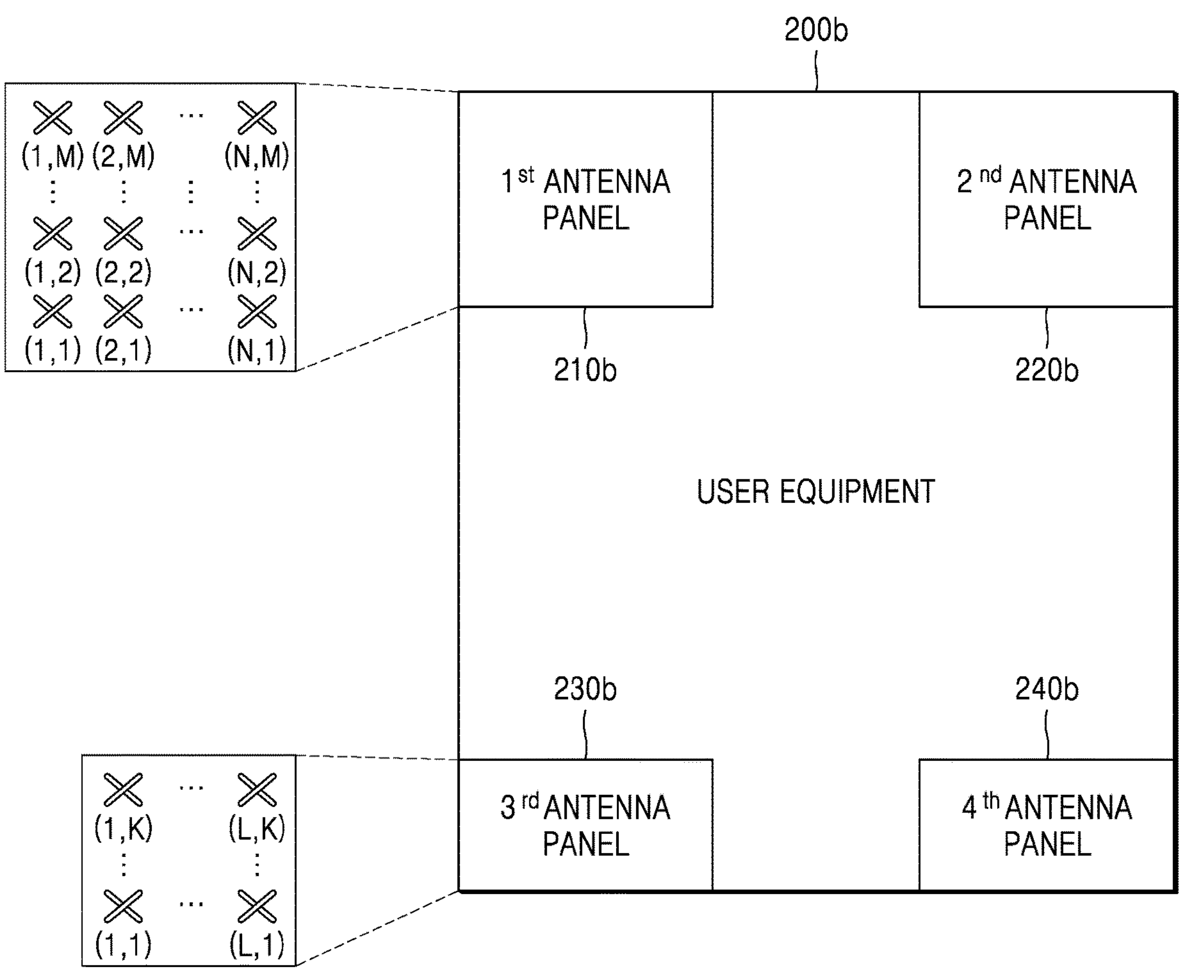

FIGS. 2A and 2B are block diagrams of UE 200a and 200b according to an example embodiment.

Referring to FIG. 2A, the UE 200a may include first to fourth antenna panels 210a to 240a. For example, a first panel antenna 210a, a second panel antenna 220a, a third panel antenna 230a and a fourth panel antenna 240a. In an example embodiment, the first to fourth antenna panels 210a to 240a may be arranged on edges of the UE 200a, respectively. However, this is merely an example, and the number of antenna panels included in the UE 200a, arrangement examples, etc. may vary.

In an example embodiment, the first antenna panel 210a may include a plurality of antenna elements arranged in an N×M matrix form (where, N is an integer equal to or greater than 1 and M is an integer equal to or greater than 1). The antenna elements may be indicated as (1,M), (2,M), . . . , (N,M) on a top row and (1,M), . . . , (1,2), (1,1) on a left-most column, (1,1), (2,1), . . . (N,1) on a bottom row, as shown in FIG. 2A. An embodiment of the first antenna panel 210a may be applied to the second to fourth antenna panels 220a to 240a.

In an example embodiment, some of the first to fourth antenna panels 210a to 240a may be turned on and communicate with the BS (1 of FIG. 1), and in this case, the others of the first to fourth antenna panels 210a to 240a may be off. According to embodiments, the UE 200a may perform communication by individually turning on/off the first to fourth antenna panels 210a to 240a, turning on/off the first to fourth antenna panels 210a to 240a in a pair unit, or turning on/off the first to fourth antenna panels 210a to 240a all at once.

For example, the UE 200a may perform communication using the first antenna panel 210a, and in this case, the second to fourth antenna panels 220a to 240a may be off. The antenna panel may be changed from the first antenna panel 210a to the second antenna panel 220a, which is based on signaling between the UE 200a and the BS (1 of FIG. 1).

As another example, the UE 200a may perform communication using the first and second antenna panels 210a and 220a, and in this case, the third and fourth antenna panels 230a and 240a may be off. Antenna panels may be changed from the first and second antenna panels 210a and 220a to the third and fourth antenna panels 230a and 240a, which is based on the signaling between the UE 200a and the BS (1 of FIG. 1).

As another example, the UE 200a may perform communication using the first to fourth antenna panels 210a to 240a, and in this case, the antenna panel change may be unnecessary.

Referring further to FIG. 2B, the UE 200b may include first to fourth antenna panels 210b to 240b. In an example embodiment, the first and second antenna panels 210b to 220b may include a plurality of antenna elements arranged in an N×M matrix form as in FIG. 2A, and the third and fourth antenna panels 230b and 240b may include a plurality of antenna elements arranged in an L×K matrix form (where, K is an integer equal to or greater than 1 and L is an integer equal to or greater than 1). For example, the third panel antenna 230b may include a top row of antenna elements (1,K), . . . , (L,K), a left-most column of antenna elements (1,K), . . . (1,1) and a bottom row of antenna elements (1,1), . . . , (L,1) as shown in FIG. 2B. In detail, configurations of the first and second antenna panels 210b to 220b may be different from those of the third and fourth antenna panels 230b and 240b. The UE 200b may provide optimum communication performance by using the first to fourth antenna panels 210b to 240b in various ways.

Embodiments may be applied to a UE, for which configuration examples and arrangement examples of various antenna panels are applied, other than the UE 200a and 200b illustrated in FIGS. 2A and 2B.

Figure 3:
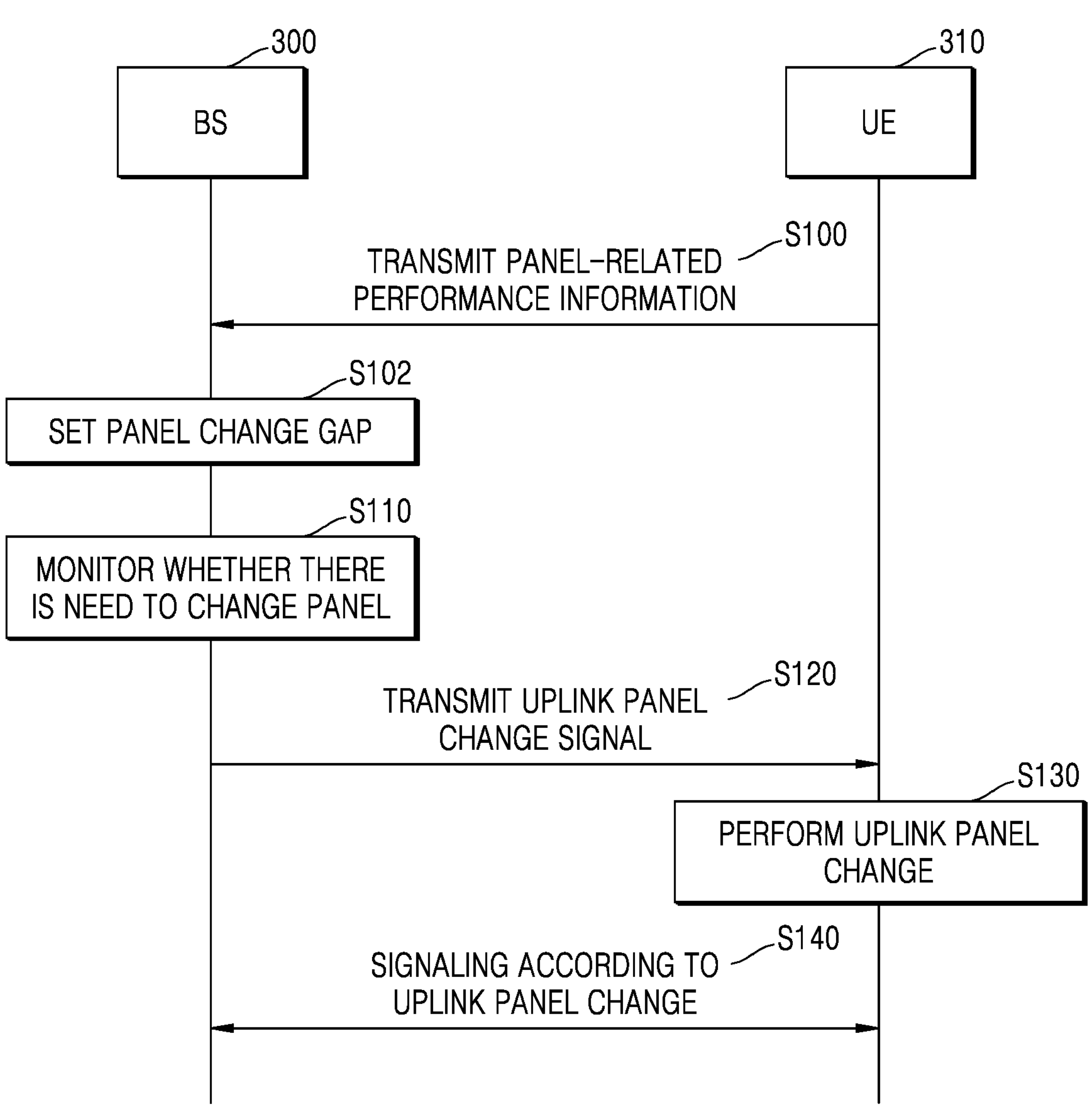
FIG. 3 is a flowchart of an operation method of user equipment and a base station, according to an example embodiment.

FIG. 3 is a flowchart of an operation method of a BS 300 and UE 310, according to an example embodiment.

Referring to FIG. 3, in operation S100, the UE 310 may transmit, to the BS 300, panel-related performance information about the UE 310. In an example embodiment, the panel-related performance information may include at least one of whether the uplink panel change by the UE 310 is changed, the number of antenna panels included in the UE 310, the maximum number of antenna panels of the UE 310 that may be simultaneously used, whether a gap for the uplink panel change by the UE 310 is generated, and a gap length. That is, the panel-related performance information may include whether the UE 310 performs the uplink panel change, information regarding a length of an uplink panel change gap, or the like, and the BS 300 may perform signaling with the UE 310, the signaling corresponding to the panel-related performance information. To this end, the BS 300 may easily identify whether the UE 310 performs the uplink panel change and may expect communication failure of the UE 310 in the uplink panel change gap, thus actively performing an operation for the communication failure. In some embodiments, when the UE 310 does not transmit the panel-related performance information to the BS 300 or when the UE 310 performs a communication operation by turning on all of the antenna panels, signaling for the uplink panel change by the BS 300 may be skipped.

In operation S102, the BS 300 may set an uplink panel change gap regarding the UE 310, based on the panel-related performance information. In an example embodiment, the BS 300 may configure a length, timing, and the like of the uplink panel change, based on the panel-related performance information.

In operation S110, the BS 300 may monitor whether an uplink panel change by the UE 310 is required. In an example embodiment, the BS 300 may monitor whether a transmission beam for transmitting an uplink signal from the UE 310 is changed and may check an uplink panel corresponding to the transmission beam that is subject to the change. The BS 300 may identify whether the uplink panel change by the UE 310 is required when the identified uplink panel is different from a previous uplink panel.

In operation S120, the BS 300 may transmit, to the UE 310, an uplink panel change signal based on a result of operation S110. In an example embodiment, the uplink panel change signal may include at least one of a gap start point in time, a gap termination point in time, and a gap length on which the uplink panel change is based. In an example embodiment, the BS 300 may transmit, to the UE 310, the uplink panel change signal through Radio Resource Control (RRC) signaling with the UE 310. In another example embodiment, the BS 300 may transmit, to the UE 310, the uplink panel change signal through Downlink Control Information (DCI) signaling or Media Access Control (MAC) signaling with the UE 310. In another example embodiment, the BS 300 may notify the UE 310 of candidates for information (e.g., at least one of the gap start point in time, the gap termination point in time, and the gap length) included in the uplink panel change signal through the RRC signaling and may allow the UE 310 to select any one of the candidates through the DCI signaling or MAC signaling. However, the embodiments are merely examples, and the BS 300 may transmit the uplink panel change signal in various manners to enable the UE 310 to easily acquire information required to perform the uplink panel change. A detailed embodiment regarding operation S120 is described below with reference to FIGS. 4A to 4C.

In operation S130, the UE 310 may perform the uplink panel change in response to the uplink panel change signal. In an example embodiment, the UE 310 may perform the uplink panel change corresponding to the gap start point in time, the gap termination point in time, and the gap length, which are included in the uplink panel change signal. A detailed embodiment regarding operation S130 is described below with reference to FIGS. 7A to 7D. Also, in operation S130, a gap, which may be generated according to the uplink panel change by the UE 310, may overlap a point in time, when a downlink signal from the BS 300 is received, or a point in time, when the uplink signal of the UE 310 is transmitted. A detailed description regarding the operation method of the UE 310 is provided below with reference to FIGS. 9A to 10B, 12A, and 12B.

In operation S140, the UE 310 may perform signaling with the BS 300, according to the uplink panel change. That is, the UE 310 may transmit, to the BS 300, the uplink signal by using a transmission beam formed by a changed uplink panel, and the BS 300 may receive the uplink signal by using a reception beam corresponding to the transmission beam of the UE 310. Also, the BS 300 may transmit, to the UE 310, the downlink signal by using a transmission beam corresponding to a current reception beam, and the UE 310 may receive the downlink signal by using a reception beam corresponding to the transmission beam of the BS 300.

Figure 4A:
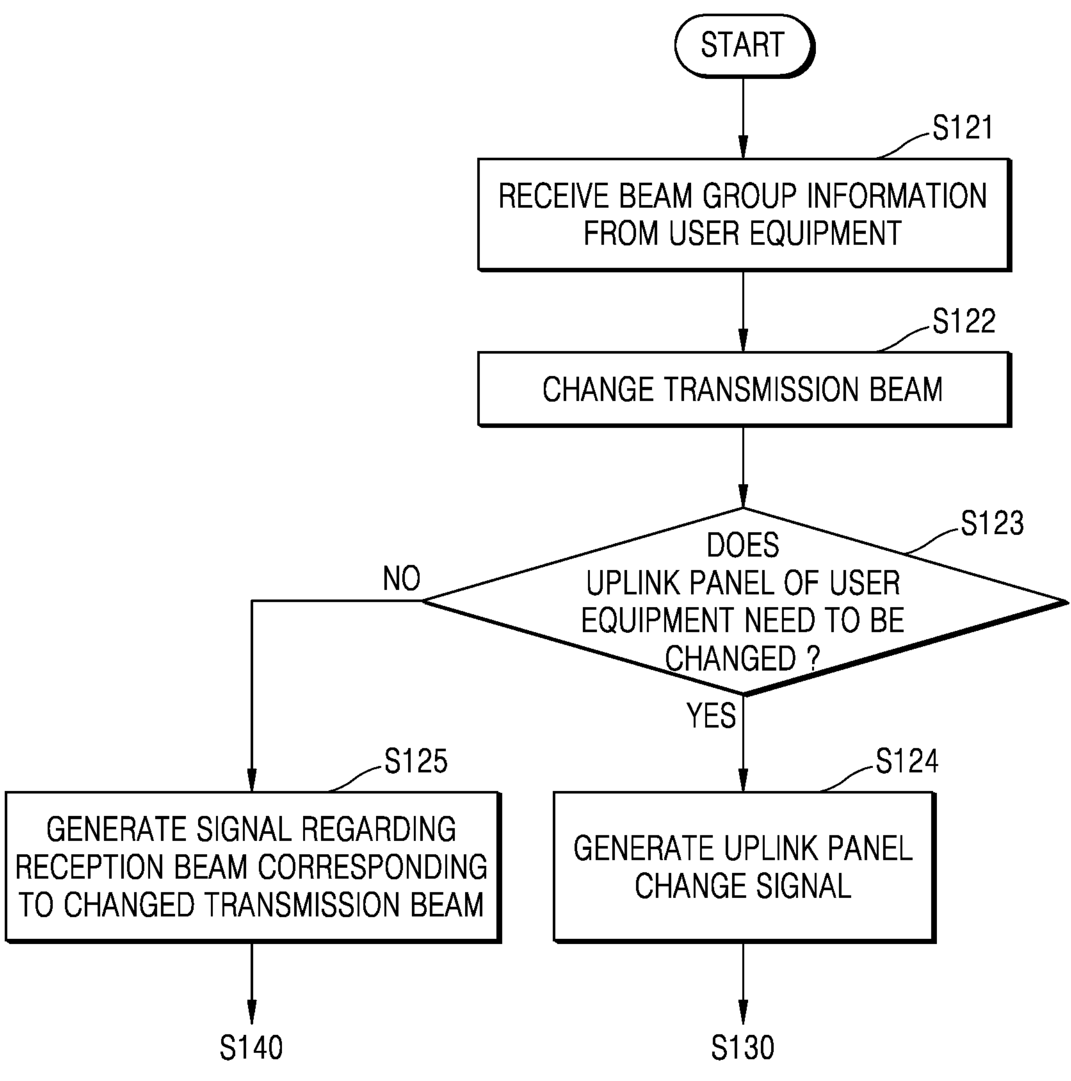
FIG. 4A is a flowchart of a detailed operation method of a base station regarding operation S120 of FIG. 3.
Figure 4B:
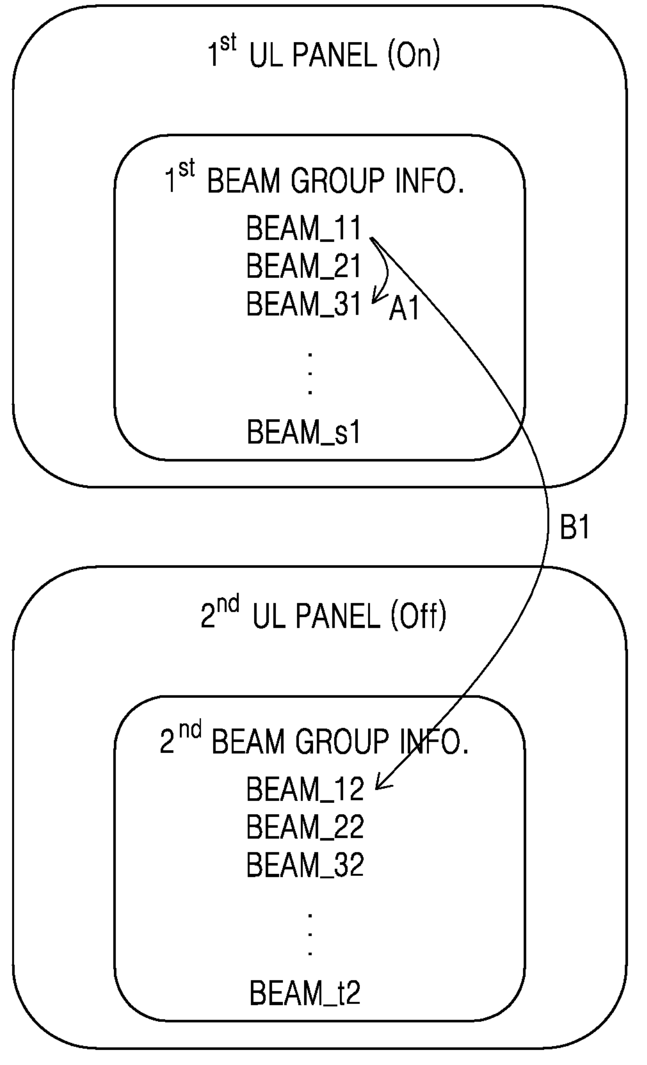
FIGS. 4B and 4C illustrate examples of using uplink panels to help the understanding of the embodiment of FIG. 4A.
Figure 4C:
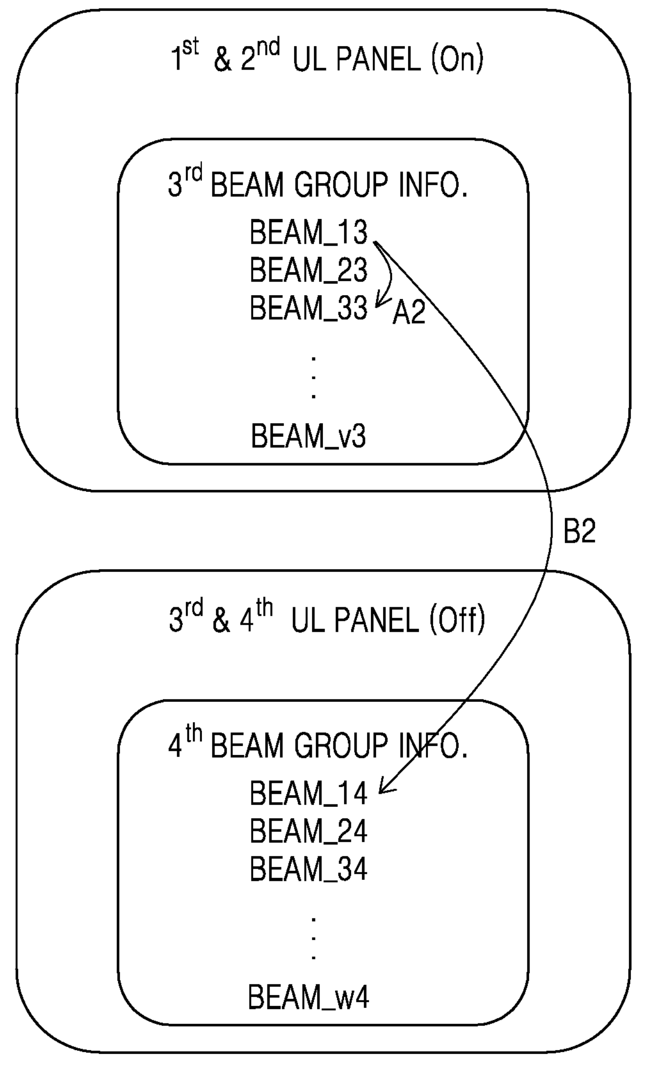

FIG. 4A is a flowchart of a detailed operation method of a BS regarding operation S120 of FIG. 3, and FIGS. 4B and 4C illustrate examples of using uplink panels to help the understanding of the embodiment of FIG. 4A.

Referring to FIG. 4A, in operation S121, the BS may receive beam group information from UE. In an example embodiment, the beam group information may be generated in a process in which the UE determines a transmission beam or a reception beam for communication with a BS. For example, the beam group information may include information regarding transmission beams or reception beams that may be formed for each antenna panel or respective antenna panels that are simultaneously used, and mapping information regarding mapping between beams of the BS and beams of the UE. In some embodiments, the transmission beam may be the same as the reception beam by considering channel reciprocity, and the beam group information may include information regarding the beams that may be formed for each antenna panel of the UE or respective antenna panels simultaneously used. Hereinafter, the beam group information is described on the premise that the transmission beam and the reception beam of the UE are the same based on the channel reciprocity. However, this is merely an example, and one or more embodiments are not limited thereto. Embodiments may be applied to an embodiment in which channel reciprocity is not applicable.

In operation S122, the BS may change the transmission beam for transmitting the downlink signal to the UE. In an example embodiment, the BS may change the transmission beam based on a downlink channel state between the UE and the BS.

In operation S123, the BS may determine whether an uplink panel of the UE needs to be changed according to operation S122. The BS may check whether the reception beam of the UE needs to be changed, based on pieces of the beam group information such that the UE may easily receive the downlink signal when the transmission beam is changed. In detail, based on the pieces of beam group information, the BS may check the reception beam of the UE, which is mapped to the changed transmission beam, and check whether the uplink panel corresponding to the transmission beam of the UE, which is the same as the checked reception beam, is different from a previous uplink panel.

When a result of operation S123 is 'YES,' operation S124 may be performed, and the BS may generate an uplink panel change signal. The uplink panel change signal may be the uplink panel change signal of operation S120 of FIG. 3. Otherwise, when the result of operation S123 is 'NO,' operation S125 may be performed, and the BS may generate a reception beam-related signal corresponding to the changed transmission beam. The BS may transmit, to the UE, the reception beam-related signal generated in operation S125, and the UE may change a reception beam in response to the reception beam-related signal.

Referring further to FIG. 4B, it is impossible to simultaneously use a first uplink panel and a second uplink panel, first beam group information about the first uplink panel may include information indicating $11^{th}$ to $s1^{th}$ beams Beam_11 to Beam_s1, and second beam group information about the second uplink panel may include information indicating $12^{th}$ to $t2^{th}$ beams Beam_12 to Beam_t2.

For example, the second uplink panel of the UE may be off, and the first uplink panel is on to form the $11^{th}$ transmission beam Beam_11, and when the $11^{th}$ transmission beam Beam_11 is changed to the $21^{th}$ transmission beam Beam_21 in the case 'A1,' an on state of the first uplink panel may be maintained, and thus, the BS may not provide an uplink panel change signal to the UE.

In another example, the second uplink panel of the UE may be off, and the first uplink panel thereof may be on to form the $11^{th}$ transmission beam Beam_11, and when the $11^{th}$ transmission beam Beam_11 is changed to the $12^{th}$ transmission beam Beam_12 in the case 'B1,' there is a need to change the first uplink panel to the second uplink panel, and thus, the BS may provide the uplink panel change signal to the UE. The UE may turn on the second uplink panel in response to the uplink panel change signal to form the $12^{th}$ transmission beam Beam_12. In some embodiments, the UE may turn off the first uplink panel in response to the uplink panel change signal.

Referring further to FIG. 4C, it is possible to simultaneously use the first and second uplink panels and simultaneously use third and fourth uplink panels, but it may be impossible to use the first and second uplink panels simultaneously with the third and fourth uplink panels. Third beam group information about the first and second uplink panels may include information indicating $13^{th}$ to $v3^{th}$ transmission beams Beam_13 to Beam_v3, and fourth group information about the third and fourth uplink panels may include information indicating $14^{th}$ to $w4^{th}$ transmission beams Beam_14 to Beam_w4.

For example, the third and fourth uplink panels of the UE may be turned off, and the first and second uplink panels thereof may be turned on to form the $13^{th}$ transmission beam Beam_13, and when the $13^{th}$ transmission beam Beam_13 is changed to the $33^{th}$ transmission beam Beam_33 in the case 'A2,' on states of the first and second uplink panels are maintained, and thus, the BS may not provide the uplink panel change signal to the UE.

In another example, the third and fourth uplink panels of the UE may be turned off, and the first and second uplink panels thereof may be turned on to form the $13^{th}$ transmission beam Beam_13, and when the $13^{th}$ transmission beam Beam_13 is changed to the $14^{th}$ transmission beam Beam_14 in the case 'B2,' there is a need to change the first and second uplink panels to the third and fourth uplink panels, and thus, the BS may provide the uplink panel change signal to the UE. The UE may form the $14^{th}$ transmission beam Beam 14 by turning on the third and fourth uplink panels in response to the uplink panel change signal. In some embodiments, the UE may turn off the first and second uplink panels in response to the uplink panel change signal.

Figure 5:
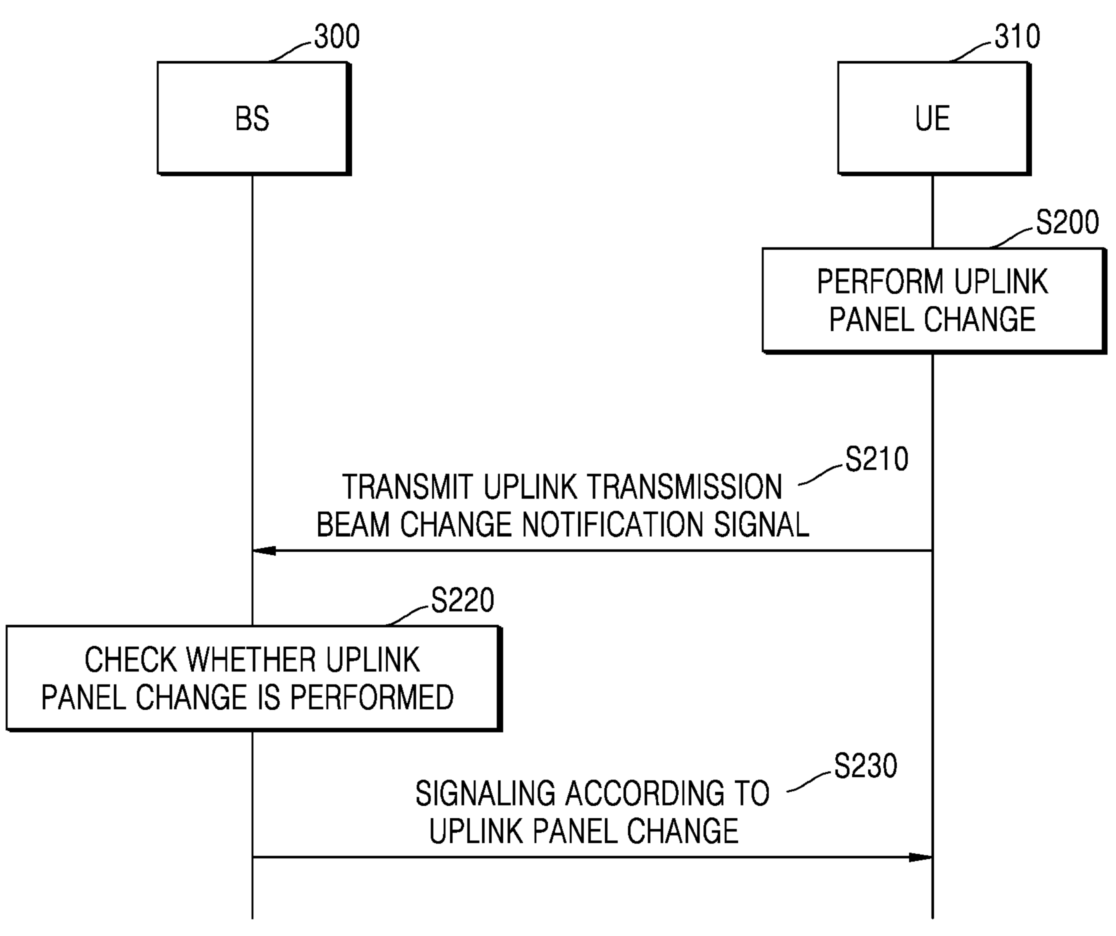
FIG. 5 is a flowchart of an operation method of a base station and user equipment, according to an example embodiment.

FIG. 5 is a flowchart of an operation method of the BS 300 and the UE 310, according to an example embodiment. In the present specification, a transmission beam of the UE 310 may be referred to as an uplink transmission beam.

Referring to FIG. 5, in operation S200, the UE 310 may independently change a transmission beam by changing an uplink panel based on the uplink channel state with the BS 300. Then, in operation S210, the UE 310 may transmit an uplink transmission beam change notification signal to the BS 300. For example, the UE 310 may transmit an uplink transmission beam change notification signal to the BS 300 through CSI transmission signaling. As another example, the UE 310 may use a Sounding Reference Signal (SRS) resource set corresponding to a transmission beam, which is to be changed, from among SRS resource sets that are set by the BS 300 and may transmit an SRS to the BS 300 as the uplink transmission beam change notification signal. In this case, the BS 300 may identify a transmission beam of the UE 310 to be changed, based on the SRS resource set to which the SRS is transmitted. In an example embodiment, the uplink transmission beam change notification signal may include at least one of a signal indicating the changed transmission beam of the UE 310 and a signal indicating a point in time when the transmission beam change of the UE 310 is terminated.

In operation S220, the BS 300 may check the uplink panel change according to the uplink transmission beam change notification signal. For example, the BS 300 may identify the uplink panel corresponding to the changed transmission beam according to the uplink transmission beam change notification signal and may check the uplink panel change. Also, the BS 300 may identify the termination point in time of the transmission beam change according to the uplink transmission beam change notification signal and reflect the termination point in time when operation S230 described below is performed.

In operation S230, the UE 310 may perform signaling with the BS 300 according to the uplink panel change. That is, the UE 310 may transmit the uplink signal to the BS 300 by using the transmission beam formed from the changed uplink panel, and the BS 300 may receive the uplink signal by using the reception beam corresponding to the transmission beam of the UE 310.

Figure 6A:
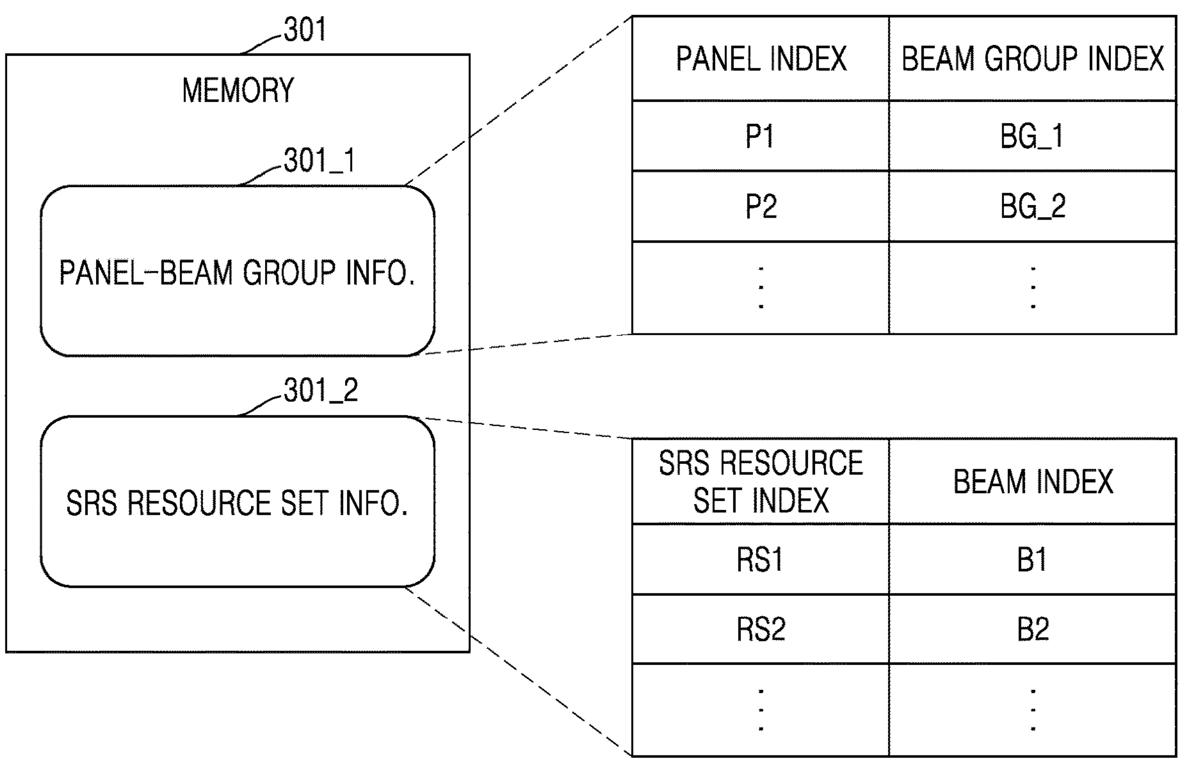
FIG. 6A illustrates information stored in a memory of a base station, according to an example embodiment.
Figure 6B:
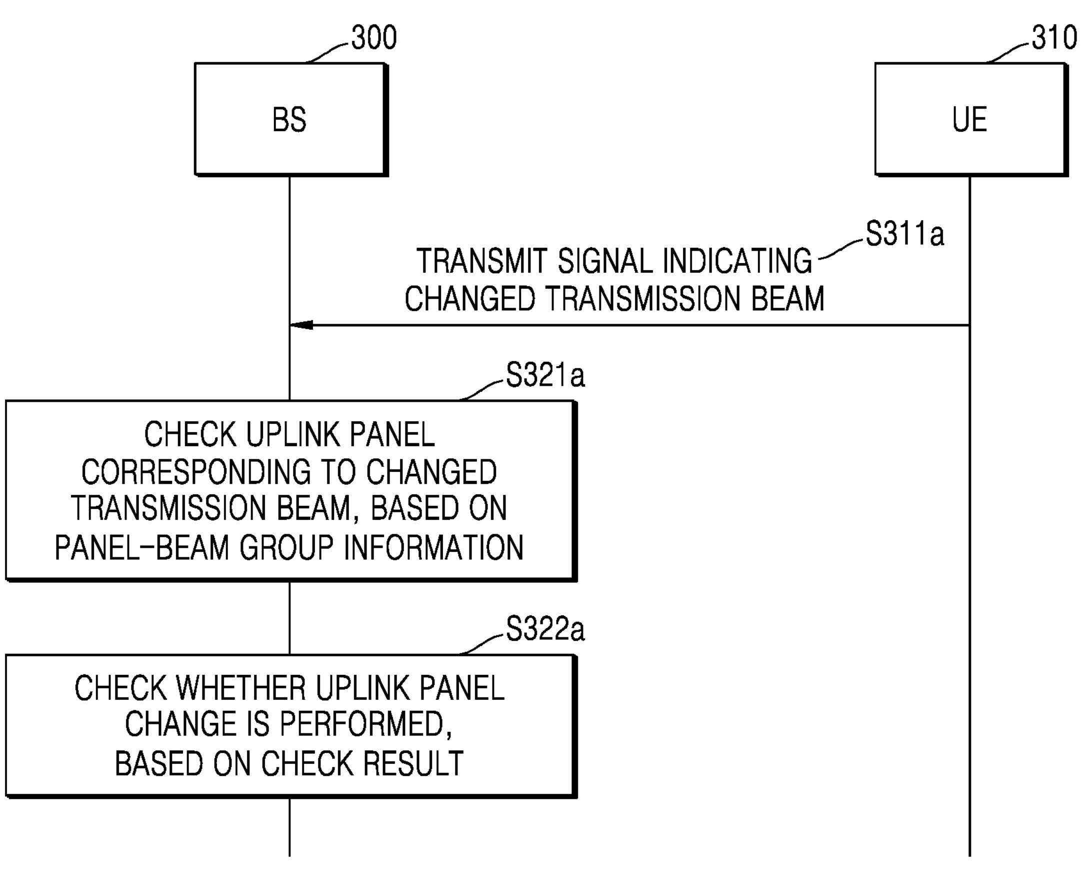
FIG. 6B is a flowchart of an operation method of a base station that uses panel-beam group information of FIG. 6A.
Figure 6C:
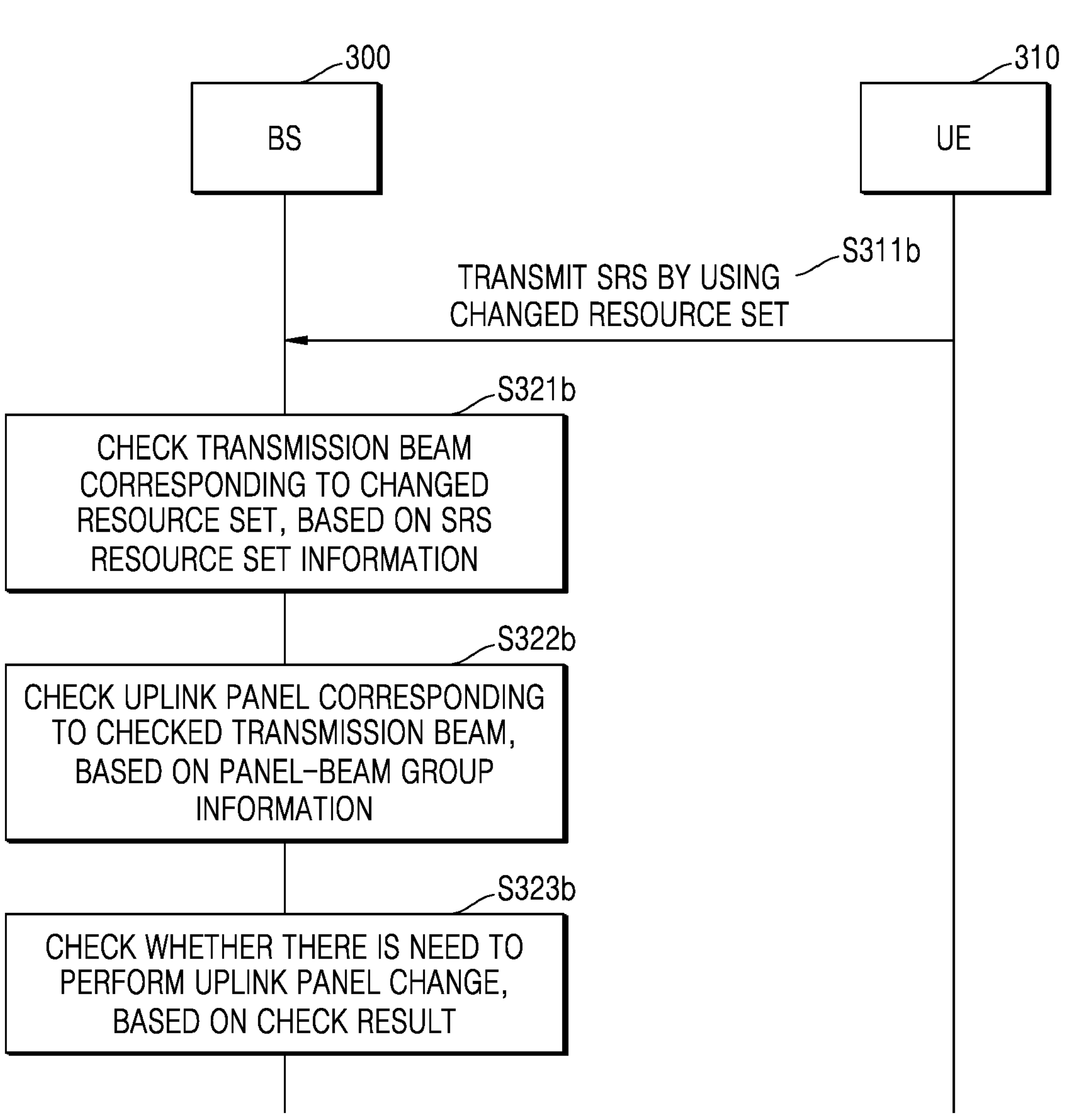
FIG. 6C is a flowchart of an operation method of a base station that uses Sounding Reference Signal (SRS) set information of FIG. 6A.

FIG. 6A illustrates information stored in a memory 301 of a BS, according to an example embodiment, FIG. 6B is a flowchart of an operation method of the BS 300 that uses panel-beam group information 301_1 of FIG. 6A, and FIG. 6C is a flowchart of the operation method of the BS 300 that uses SRS resource set information 301_2 of FIG. 6A.

Referring to FIG. 6A, in the memory 301 of the BS, at least one of the panel-beam group information 301_1 and the SRS resource set information 301_2 may be stored. In a memory of the UE, at least one of the panel-beam group information 301_1 and the SRS resource set information 301_2 may also be stored. That is, the BS and the UE may share at least one of the panel-beam group information 301_1 and the SRS resource set information 301_2. The panel-beam group information 301_1 may include information indicating a plurality of beam groups BG_1, BG_2, . . . that respectively correspond to a plurality of uplink panels P1, P2, . . . of the UE. For example, first beams included in a first beam group BG_1 may be formed on a first uplink panel P1, and second beams included in a second beam group BG_2 may be formed in a second uplink panel P2.

Referring further to FIG. 6B, in operation S311*a*, the UE 310 may transmit a signal indicating a changed transmission beam. A signal indicating a transmission beam to be changed may be included in the uplink transmission beam change notification signal of operation S210 of FIG. 5.

In operation S321*a*, the BS 300 may check an uplink panel corresponding to the changed transmission beam, based on the panel-beam group information 301_1. For example, when the changed transmission beam is included in the second beam group BG_2, the BS 300 may check the second uplink panel P2 corresponding to the transmission beam to be changed. In operation S322*a*, the BS 300 may check whether the uplink panel has changed, based on the check result. For example, the BS 300 may check whether the uplink panel has changed, according to whether the checked second uplink panel P2 is the same as or different from a current uplink panel.

Referring back to FIG. 6A, the SRS resource set information 301_2 may include information indicating the beam groups BG_1, BG_2, . . . that respectively correspond to a plurality of SRS resource sets RS1, RS2, . . . . For example, the UE may transmit an SRS by using a first SRS resource set RS1 to notify the BS that the transmission beam is changed to a first transmission beam B1. As another example, the UE may transmit an SRS by using a second SRS resource set RS2 to notify that the transmission beam is changed to a second transmission beam B2.

Referring further to FIG. 6C, in operation S311*b*, the UE 310 may transmit an SRS by using a changed resource set. The SRS, which is transmitted by using the changed resource set, may be included in the uplink transmission beam change notification signal of operation S210 of FIG. 5.

In operation S321*b*, the BS 300 may identify the transmission beam corresponding to a changed resource set, based on SRS resource set information. For example, when a transmission beam to be changed is the second transmission beam B2, the BS 300 may receive the SRS from the UE 310 by using the second SRS resource set RS2 and may confirm that the transmission beam to be changed is the second transmission beam B2.

In operation S322*b*, the BS 300 may check an uplink panel corresponding to the checked transmission beam, based on the panel-beam group information. For example, when the checked second transmission beam B2 is included in the second beam group BG_2, the BS 300 may check the second uplink panel P2 corresponding to the transmission beam to be changed. In operation S323*b*, the BS 300 may check whether the uplink panel has changed, based on the check result. For example, the BS 300 may check whether the uplink panel has changed, according to whether the checked second uplink panel P2 is the same as or different from a current uplink panel.

Figure 7A:
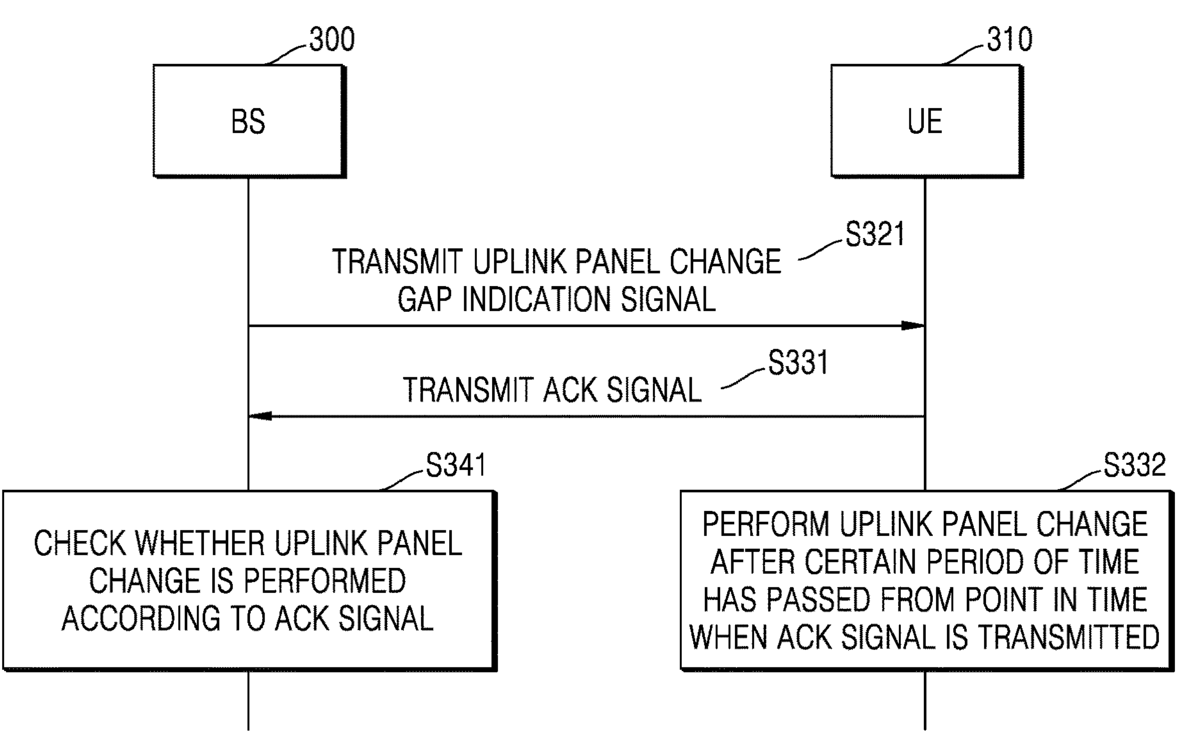
FIG. 7A is a flowchart for explaining in detail an operation method of a base station and user equipment with regard to operation S120 of FIG. 3.
Figure 7B:
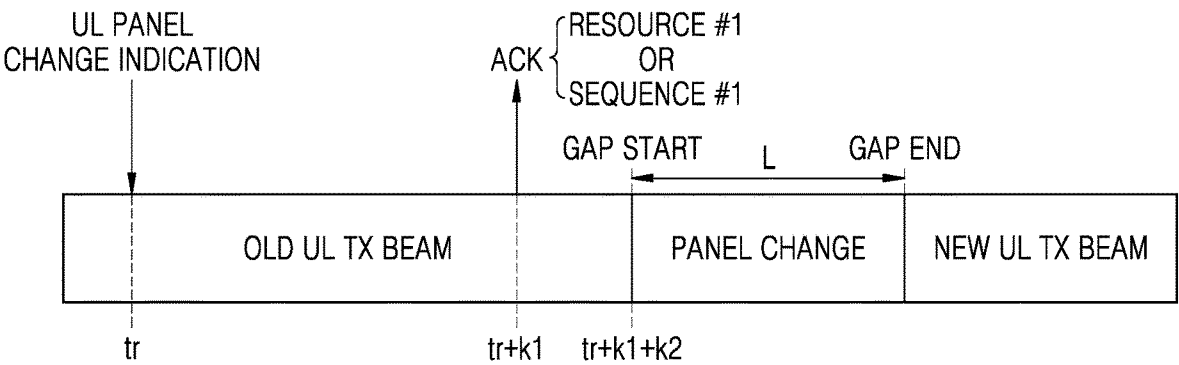
FIGS. 7B to 7D are diagrams for explaining points in time when an uplink panel change is performed by user equipment.
Figure 7C:
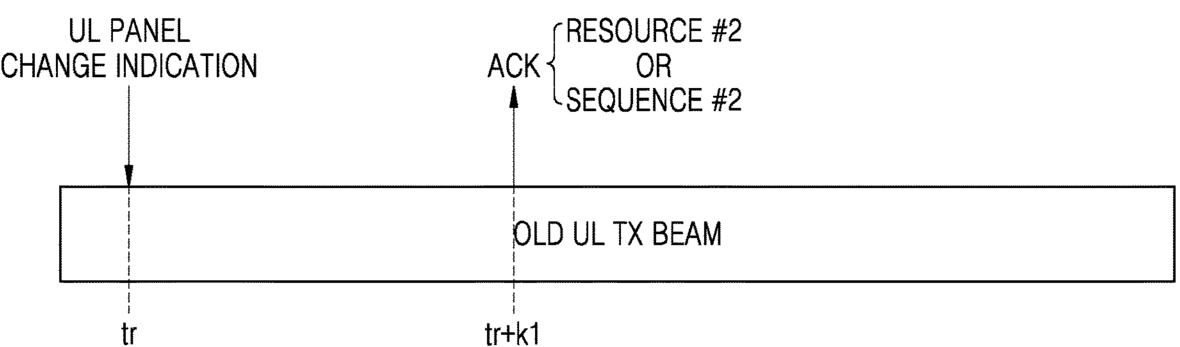

FIG. 7A is a flowchart for explaining in detail an operation method of the BS 300 and the UE 310 with regard to operation S120 of FIG. 3, and FIGS. 7B and 7C are diagrams for explaining points in time when the uplink panel change of the UE 310 is performed.

Referring to FIG. 7A, in operation S321, the BS 300 may transmit, to the UE 310, an uplink panel change gap indication signal. In an example embodiment, the uplink panel change gap indication signal may include at least one of a gap start point in time, a gap termination point in time, and a gap length.

In operation S331, the UE 310 may transmit, to the BS 300, an ACK signal indicating that the uplink panel change gap indication signal is received. In operation S332, the UE 310 may change an uplink panel after a certain period of time has passed from a point in time when the ACK signal is transmitted. In operation S341, the BS 300 may check whether the uplink panel of the UE 310 has changed, according to the ACK signal.

Referring further to FIG. 7B, the UE 310 may form an old uplink transmission beam in a first uplink panel and receive the uplink panel change indication signal from the BS 300 in a 'tr' point in time while communicating with the BS 300. The UE 310 may transmit the ACK signal to the BS 300 in a 'tr+k1' point in time after a first time k1 from the 'tr' point in time. The UE 310 may start changing the uplink panel to a second uplink panel in a 'tr+k1+k2' point in time after a second time k2 from the 'tr+k1' point in time. In the present specification, an uplink panel change start may be defined as a gap start. The UE 310 may perform the uplink panel change in a length L of an uplink panel change gap and may form a new uplink transmission beam in the second uplink panel. In the present specification, an uplink panel change termination may be defined as gap termination. Also, the UE 310 may provide the BS 300 with a signal indicating that the uplink panel change has been completed.

In an example embodiment, at least one of the gap start, the gap termination, and the gap length L may be included in the uplink panel change gap indication signal of FIG. 7A. Also, the gap length L may have an absolute value (e.g., a value in a millisecond unit) or a unit such as a symbol or a slot. In some embodiments, the BS 300 may generate the uplink panel change gap indication signal based on the number of antenna panels of the UE 310 or the number of antenna panels that may be simultaneously used. In some embodiments, the BS 300 may generate the uplink panel change gap indication signal based on information regarding a time required for the uplink panel change, the information being received from the UE 310.

In an example embodiment, the BS 300 may configure in advance at least one of the first time k1 and the second time k2, based on the performance of the UE 310. For example, the BS 300 may configure the first time k1 and the second time k2, based on the number of antenna panels of the UE 310, the usage of the antenna panels, and the like. In an example embodiment, the BS 300 may provide a value (e.g., the first time k1 and the second time k2) configured in the UE 310 according to a method such as RRC signaling, MAC signaling, or DCI signaling. In some embodiments, the UE 310 may independently configure the first time k1 and the second time k2 based on the performance of the UE 310.

In an example embodiment, the UE 310 may transmit, to the BS 300, an ACK signal by using a first resource Resource #1 to notify the BS 300 of the uplink panel change, or transmit an ACK signal having a first sequence Sequence #1 to the BS 300. The BS 300 may identify that the UE 310 performs the uplink panel change, in response to the ACK signal received using the first resource Resource #1 or may identify that the UE 310 performs the uplink panel change, in response to the ACK signal having the first sequence Sequence #1.

Referring further to FIG. 7C, the UE 310 may transmit, to the BS 300, an ACK signal by using a second resource Resource #2 to notify the BS 300 that the uplink panel change is not performed, or may transmit an ACK signal having a second sequence Sequence #2 to the BS 300. The BS 300 may identify that the UE 310 does not perform the uplink panel change, in response to the ACK signal received using the second resource Resource #2, or may identify that the UE 310 does not perform the uplink panel change, in response to the ACK signal having the second sequence Sequence #2.

Figure 7D:
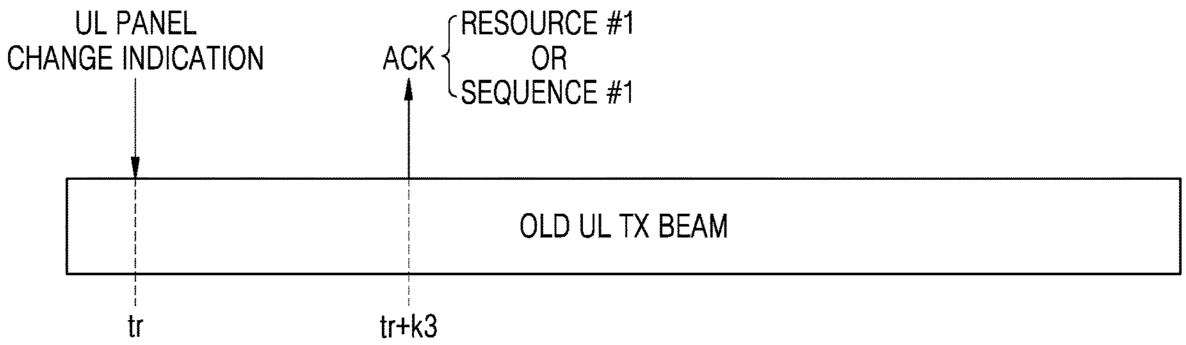

Referring further to FIG. 7D, unlike the illustration of FIG. 7C, the UE 310 may transmit, to the BS 300, the ACK signal to notify the BS 300 that the UE 310 does not perform the uplink panel change, wherein the transmission is performed in a 'tr+k3' point in time after a third time k3 from the 'tr' point in time when the uplink panel change indication signal is received.

In an example embodiment, as illustrated in FIG. 7B, the BS 300 may identify that the UE 310 performs the uplink panel change, according to the ACK signal transmitted from the UE 310 in the 'tr+k1' point in time and that the UE 310 does not perform the uplink panel change, according to the ACK signal transmitted from the UE 310 in the 'tr+k3' point in time.

In an example embodiment, the BS 300 may attempt decoding a Physical Uplink Control Channel (PUCCH) in points in time corresponding to the first time k1 and the third time k3 to detect the ACK signal received from the UE 310. When confirming that the ACK signal is transmitted in the 'tr+1' point in time as a result of decoding the PUCCH, the BS 300 may identify that the UE 310 performs the uplink panel change, and when confirming that the ACK signal is transmitted in the 'tr+k3' point in time, the BS 300 may identify that the UE 310 does not perform the uplink panel change.

However, the embodiments of FIGS. 7B to 7D are merely examples, and one or more embodiments are not limited thereto. The UE 310 may transmit the ACK signal to the BS 300 and notify the BS 300 of whether the uplink panel change is performed, according to various methods.

Figure 8A:
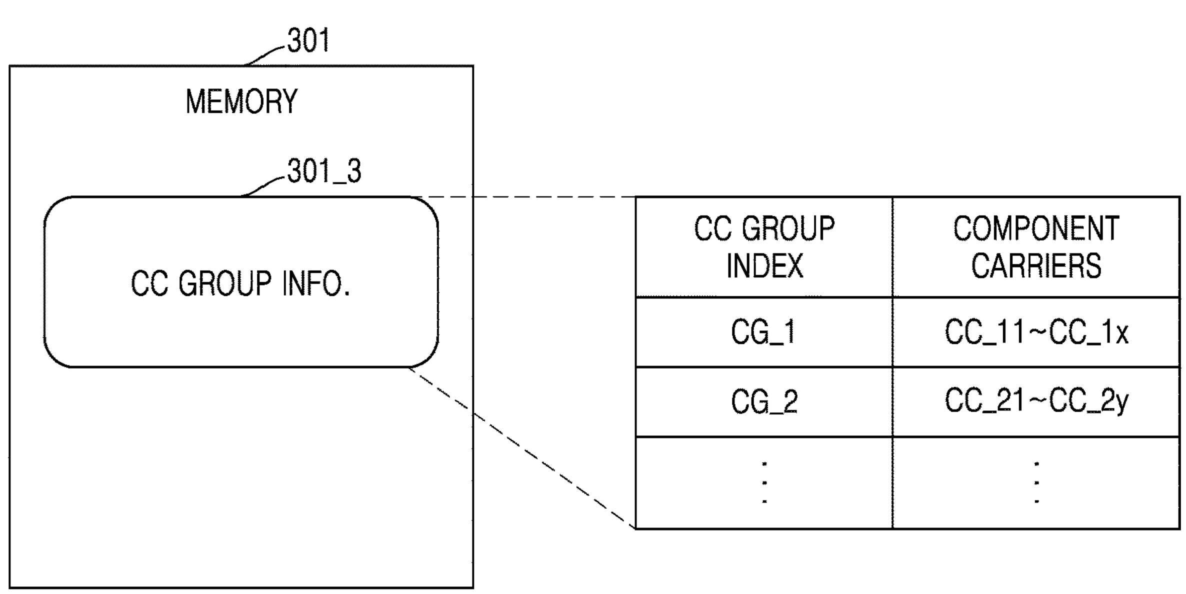
FIG. 8A illustrates information stored in a memory of a base station, according to an example embodiment.
Figure 8B:
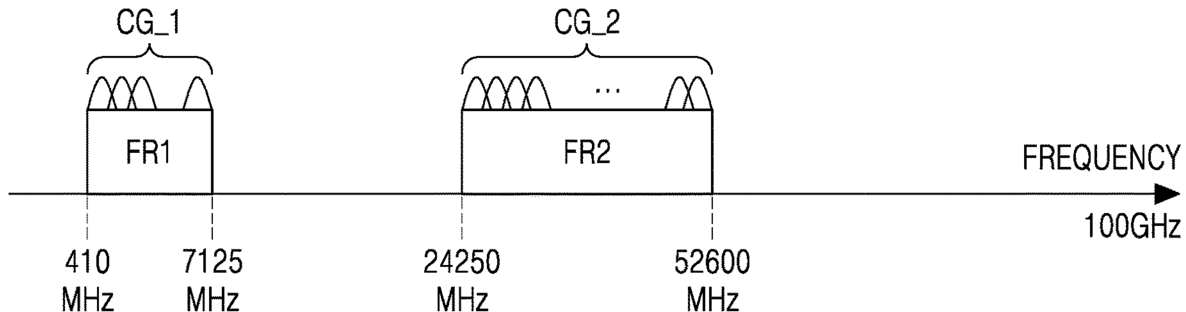
FIGS. 8B and 8C are diagrams for explaining a Carrier Component (CC) group of FIG. 8A.
Figure 8C:
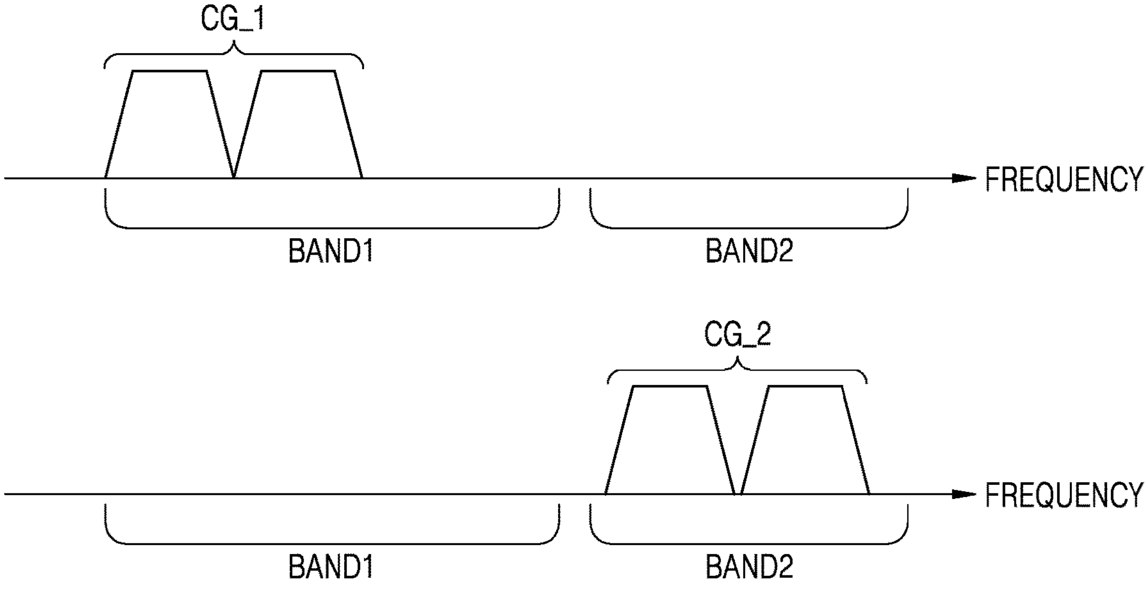
Figure 8D:
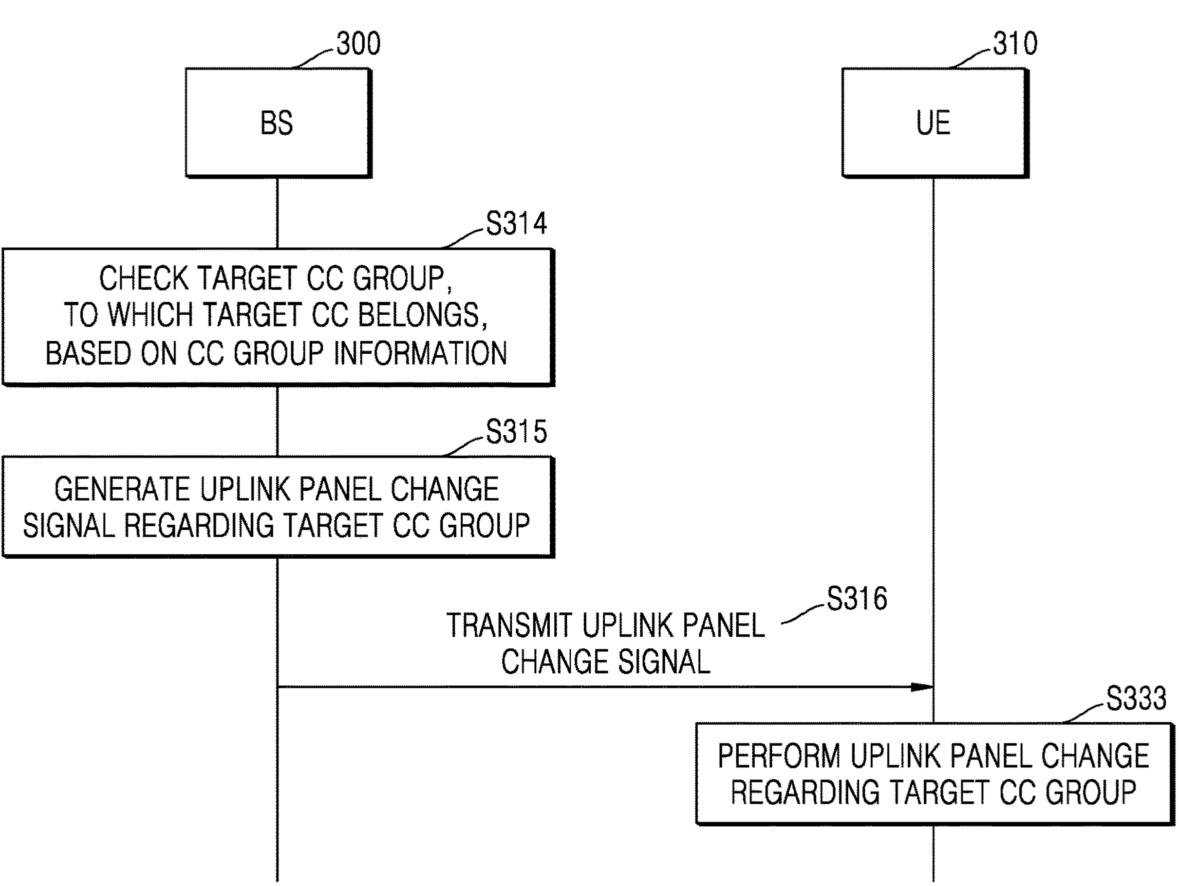
FIG. 8D is a flowchart of an operation method of a base station and user equipment that use CC group information of FIG. 8A.

FIG. 8A illustrates information stored in the memory 301 of the BS, according to an example embodiment, FIGS. 8B and 8C are diagrams for explaining a Carrier Component (CC) group of FIG. 8A, and FIG. 8D is a flowchart of an operation method of the BS 300 and the UE 310 using CC group information of FIG. 8A.

Referring to FIG. 8A, CC group information 301_3 may be stored in the memory 301. The CC group information 301_3 may also be stored in the memory of the UE. That is, the BS and the UE may share the CC group information 301_3. The CC group information 301_3 may include information indicating CCs respectively corresponding to CC groups CG_1, CG_2, . . . . For example, a first CC group CG_1 may include $11^{th}$ CC to $1x^{th}$ CC CC_11 to CC_1*x*, and the second CC group CG_2 may include $21^{st}$ CC to $2y^{th}$ CC CC_21 to CC_2*y*.

Referring further to FIG. 8B, in an NR-related communication system, a portion in a range from about 410 MHz to about 7125 MHz may be defined as a first frequency region FR1, and CCs in the first frequency region FR1 may be included in a first CC group CG_1. Also, a portion in a range from about 24250 MHz to about 52600 MHz may be defined as a second frequency region FR2, and CCs in the second frequency region FR2 may be included in a second CC group CG_2. However, this is merely an example, and one or more embodiments are not limited thereto. The first and second frequency regions FR1 and FR2 may be variously defined.

Referring further to FIG. 8C, a frequency region in a communication system, to which carrier aggregation is applied, may include a first frequency band Band1 and a second frequency band Band2. In an example embodiment, in an intra mode in the carrier aggregation, CCs in the first frequency band Band1 may be included in the first CC group CG_1, and CCs in the second frequency band Band2 may be included in the second CC group CG_2. However, this is merely an example, and one or more embodiments are not limited thereto. CC groups may be defined with regard to a greater number of frequency bands, and in an inter mode in the carrier aggregation, CCs in two or more frequency bands may be included in one CC group.

Referring further to FIG. 8D, in operation S314, the BS 300 may check a target CC group, to which a target CC belongs, based on CC group information. In the present specification, the target CC may denote a CC corresponding to the uplink panel change of the UE 310. In detail, the target CC may correspond to a transmission beam formed by a changed uplink panel. For example, when the target CC is the $11^{th}$ CC CC_11, the BS 300 may check the first CC group CG_1 as the target CC group.

In operation S315, the BS 300 may generate an uplink panel change signal regarding the target CC group. For example, the BS 300 may generate the uplink panel change signal regarding the $11^{th}$ CC to the $1x^{th}$ CC CC_11 to CC_1*x* included in the target CC group.

In operation S316, the BS 300 may transmit, to the UE 310, the uplink panel change signal generated in operation S315.

In operation S333, the UE 310 may perform the uplink panel change on the target CC group. For example, the UE 310 may perform an additional uplink panel change operation regarding the $12^{th}$ CC to the $1x^{th}$ CC CC_12 to CC_1*x* included in the target CC group, along with an uplink panel change operation regarding the $11^{th}$ CC CC_11.

Figure 9:
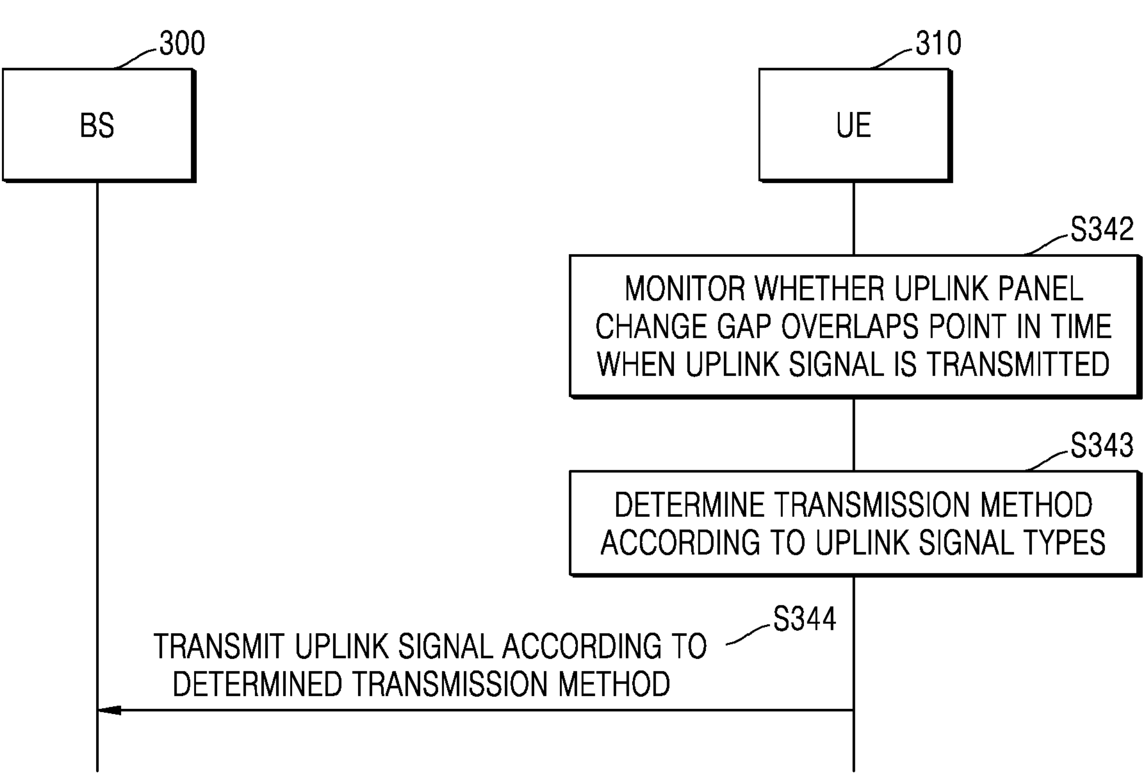
FIG. 9 is a flowchart of an operation method of a base station and user equipment, according to an example embodiment.

FIG. 9 is a flowchart of an operation method of the BS 300 and the UE 310, according to an example embodiment.

Referring to FIG. 9, in operation S342, the UE 310 may monitor whether a point in time, when an uplink signal is transmitted, overlaps an uplink panel change gap. In detail, the UE 310 may check whether the point in time, when the uplink signal is transmitted, overlaps an uplink panel change gap between a point in time, when an uplink panel change starts, and a point in time, when the uplink panel change is terminated. Because the UE 310 may not easily transmit the uplink signal to the BS 300 in the uplink panel change gap, there is a need for a certain agreement between the UE 310 and the BS 300 in such a case.

In operation S343, the UE 310 may determine a transmission method of the uplink signal according to uplink signal types. In an example embodiment, the UE 310 may drop the uplink signal in the uplink panel change gap according to the uplink signal types or may transmit the uplink signal to the BS 300 in a next transmission point in time after the uplink panel change is terminated.

In operation S344, the UE 310 may transmit the uplink signal according to the determined transmission method. In an example embodiment, in certain points in time, the BS 300 may decode a PUCCH or a Physical Uplink Shared Channel (PUSCH) including the uplink signal to detect the uplink signal. The points in time, when the BS 300 decodes the PUCCH or the PUSCH, may be set in advance.

Figure 10A:
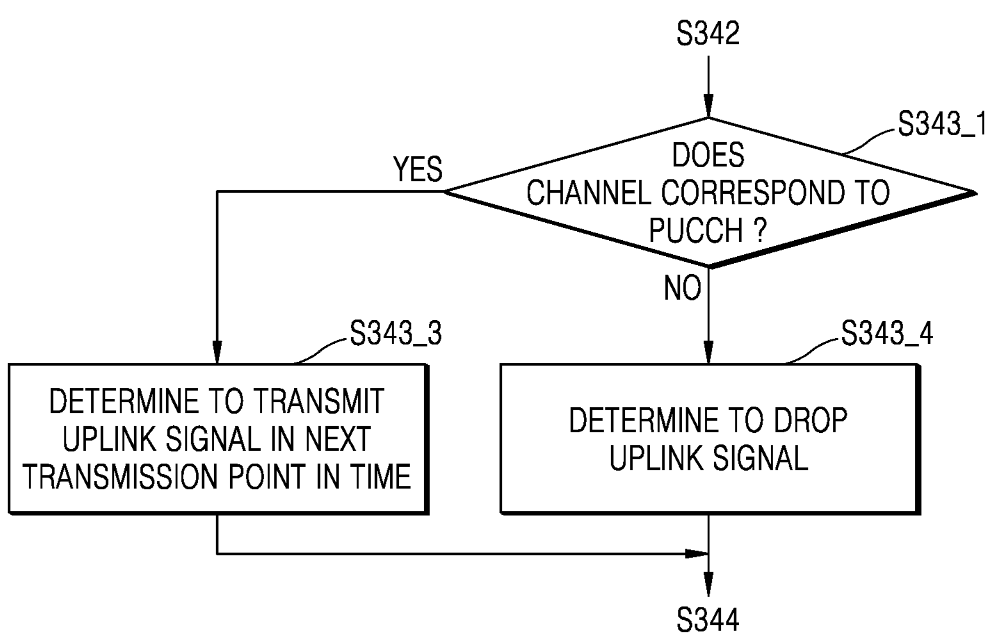
FIGS. 10A and 10B are flowcharts for explaining operations S342 and S343 of FIG. 9 in detail.
Figure 10B:
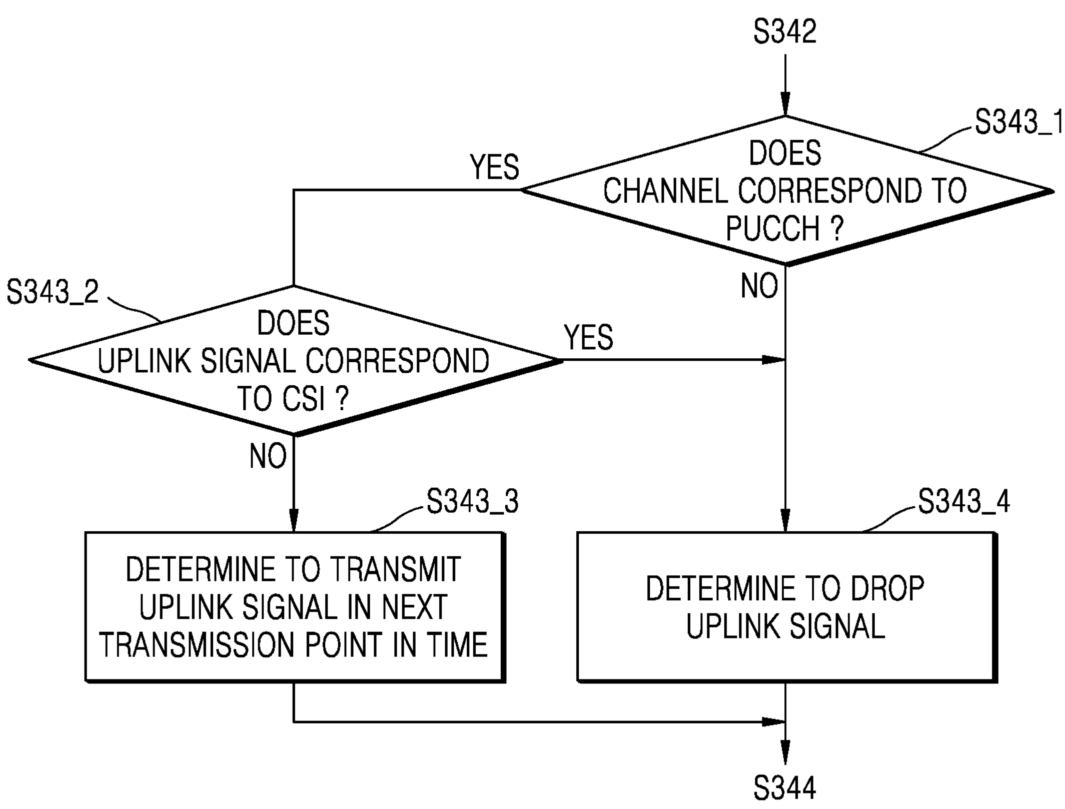

FIGS. 10A and 10B are flowcharts for explaining operations S342 and S343 of FIG. 9 in detail.

Referring to FIG. 10A, in operation S343_1 after operation S342 of FIG. 9, the UE may determine whether a channel including the uplink signal is the PUCCH. When a result from operation S343_1 is 'YES,' operation S343_3 is performed, and the UE may determine that the uplink signal is to be transmitted in a next transmission point in time after the uplink panel change is terminated. Otherwise, when the result from operation S343_1 is 'NO,' operation S343_4 may be performed, and the UE may determine to drop the uplink signal. Then, operation S344 may be subsequently performed.

Referring to FIG. 10B, in operation S343_1 after operation S342 of FIG. 9, the UE may determine whether a channel including the uplink signal is the PUCCH. When a result from operation S343_1 is 'YES,' operation S343_2 may be performed, and the UE may determine whether the uplink signal is CSI. When a result from operation S343_2 is 'NO,' operation S343_3 may be performed, and the UE may determine to transmit the uplink signal in a next transmission point in time after the uplink panel change is terminated. Otherwise, when the result from operation S343_1 is 'NO' or the result from operation S343_2 is 'YES,' operation S343_4 may be performed, and the UE may determine to drop the uplink signal. That is, when a channel including the uplink signal is the PUCCH, and when the uplink signal is CSI, the UE may determine to transmit the uplink signal in the next transmission point in time, and when the uplink signal is an ACK/NACK signal regarding a downlink signal or a scheduling request, the UE may determine to drop the uplink signal. Then, operation S344 may be subsequently performed. However, this is merely an example, and one or more embodiments are not limited thereto. Various transmission methods may be determined according to the uplink signal types.

Figure 11:
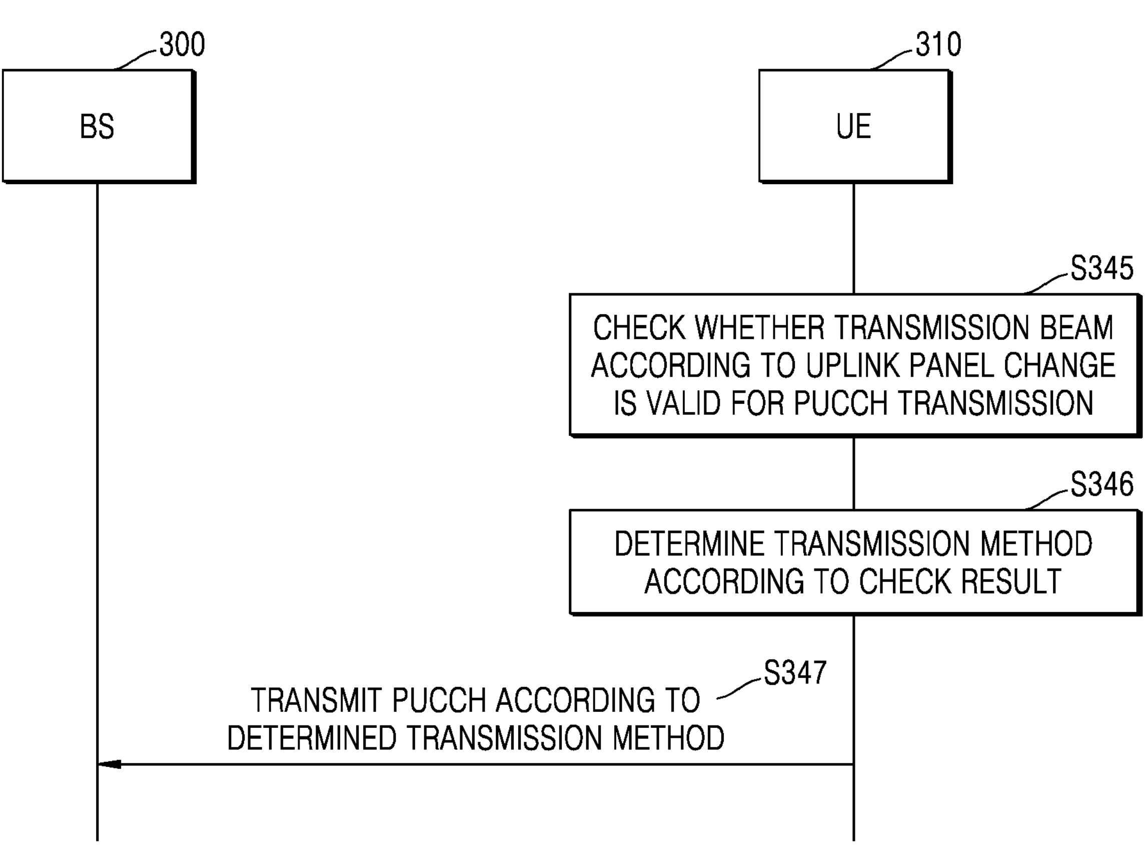
FIG. 11 is a flowchart of an operation method of a base station and user equipment, according to an example embodiment.

FIG. 11 is a flowchart of an operation method of the BS 300 and the UE 310, according to an example embodiment. In FIG. 11, it is assumed that the uplink panel change is performed to change a transmission beam for transmitting a PUCCH.

Referring to FIG. 11, in operation S345, the UE 310 may check whether the transmission beam for the uplink panel change is valid to transmit the PUCCH. In operation S346, the UE 310 may determine a transmission method according to the check result. In operation S347, the UE 310 may transmit the PUCCH to the BS 300 according to the determined transmission method.

Figure 12A:
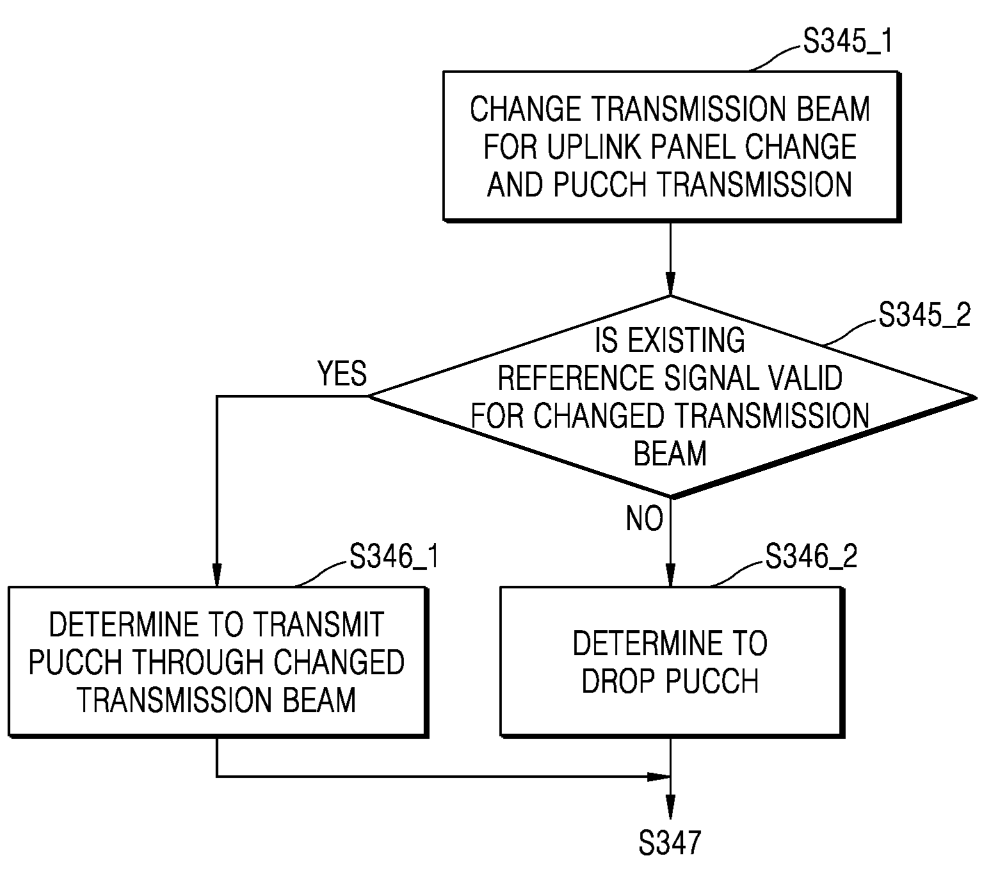
FIGS. 12A and 12B are flowcharts for explaining operations S345 and S346 of FIG. 11 in detail.
Figure 12B:
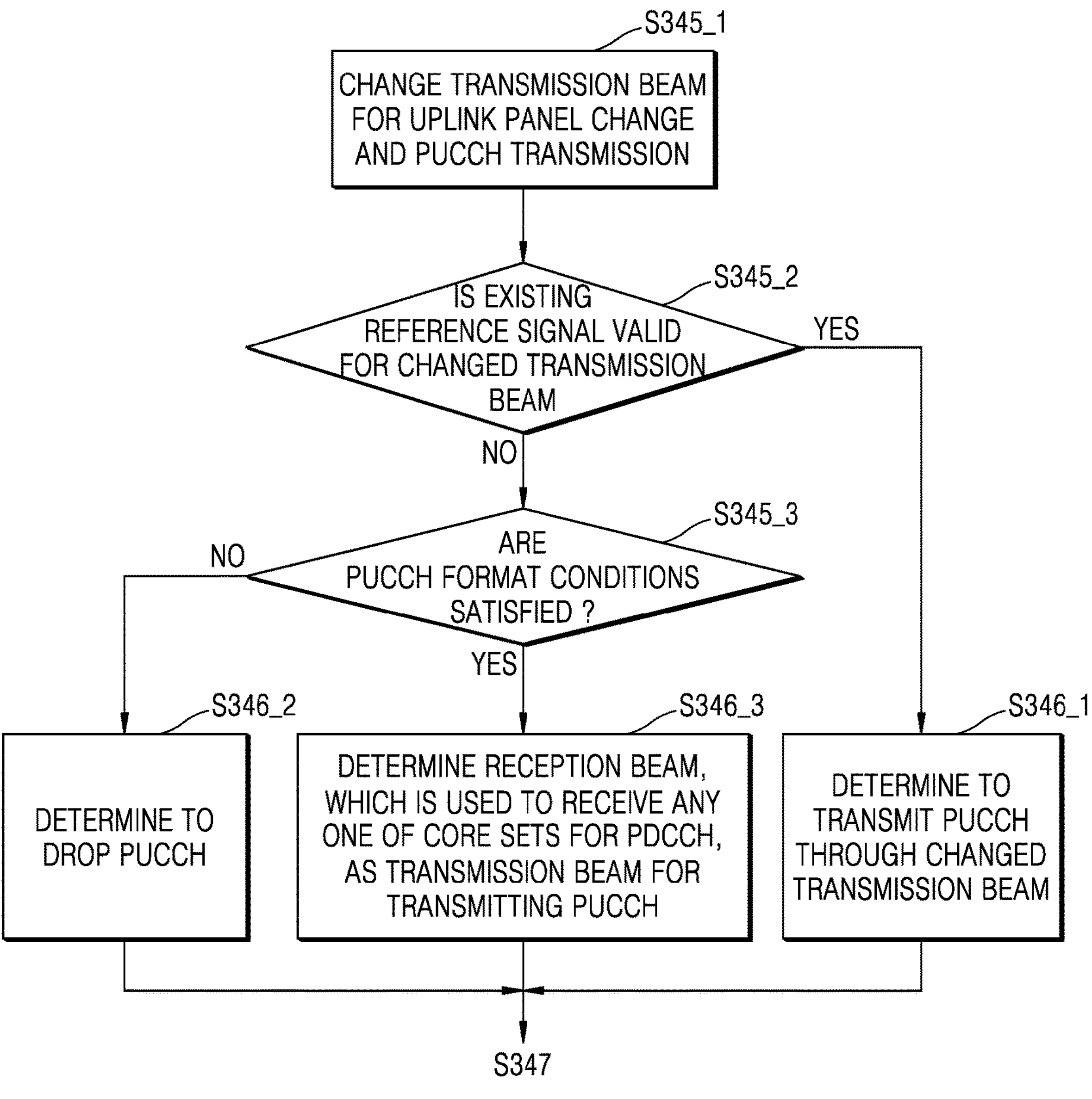

FIGS. 12A and 12B are flowcharts for explaining operations S345 and S346 of FIG. 11 in detail.

Referring to FIG. 12A, in operation S345_1, the UE may change the transmission beam for the uplink panel change and the PUCCH transmission. In some embodiments, the transmission beam for transmitting the PUCCH may be identical to the transmission beam for transmitting the PUSCH.

In operation S345_2, the UE may determine whether an existing reference signal is valid for the changed transmission beam. In an example embodiment, the existing reference signal is used to determine a previous transmission beam of the UE, and the UE may determine whether the existing reference signal is valid for the changed transmission beam, based on a strength of the existing reference signal and the like. For example, the UE may determine that the existing reference signal is valid in a case where the reception strength when the existing reference signal is received by the changed transmission beam is greater than a threshold value, and when the reception strength is equal to or less than the threshold value, the UE may determine that the existing reference signal is invalid.

When a result from operation S345_2 is 'YES,' operation S346_1 may be subsequently performed, and the UE may determine to transmit the PUCCH through the changed transmission beam. Otherwise, when a result from operation S345_2 is 'NO,' operation S346_2 may be subsequently performed, and the UE may determine to drop the PUCCH. Then, operation S347 may be subsequently performed.

Referring to FIG. 12B, in operation S345_1, the UE may change the transmission beam for the uplink panel change and the PUCCH transmission. In some embodiments, the transmission beam for the PUCCH transmission may be the same as the transmission beam for the PUSCH transmission.

In operation S345_2, the UE may determine whether the existing reference signal is valid for the changed transmission beam.

When the result from operation S345_2 is 'YES,' operation S346_1 may be subsequently performed, and the UE may determine to transmit the PUCCH through the changed transmission beam.

Otherwise, when the result from operation S345_2 is 'NO,' operation S345_3 may be subsequently performed, and the UE may determine whether a current PUCCH format satisfies PUCCH format conditions. In an example embodiment, the UE may check whether the PUCCH format is PUCCH format 0/1 as the PUCCH format condition. For example, when the current PUCCH format is the PUCCH format 0/1, the UE may determine that the PUCCH format conditions are satisfied, and when the current PUCCH format is PUCCH format 2/3, the UE may determine that the PUCCH format conditions are not satisfied.

When a result from operation S345_3 is 'NO,' operation S346_2 may be subsequently performed, and the UE may determine to drop the PUCCH.

Otherwise, when the result from operation S345_3 is 'YES,' operation S346_3 may be subsequently performed, and the UE may determine a reception beam, which is used to receive any one of control resource sets (CORESETs) for a Physical Downlink Control Channel (PDCCH), as a transmission beam for transmitting the PUCCH. For example, the UE may determine, as the transmission beam for transmitting the PUCCH, a reception beam used to receive a CORESET using the lowest index among the CORESETs for the PDCCH. That is, the reception beam, which is used to receive the CORESET using the lowest index, may be the widest compared to other reception beams. Then, operation S347 may be subsequently performed. In the present specification, the transmission of a control channel or a shared channel may indicate that a downlink signal or an uplink signal is transmitted using the control channel or the shared channel.

In some embodiments, a signal, to which operation S346_3 is applied, may be an ACK/NACK signal of the PUCCH, and a signal skipped in operation S346_3 may be CSI or a scheduling request of the PUCCH. That is, when the signal is the CSI or the scheduling request, and when the result from operation S345_2 is 'NO,' operation S345_3 may be skipped, and operation S346_2 may be immediately performed. However, this is merely an example, and one or more embodiments are not limited thereto. Various embodiments may be applied for the PUCCH transmission.

Figure 13:
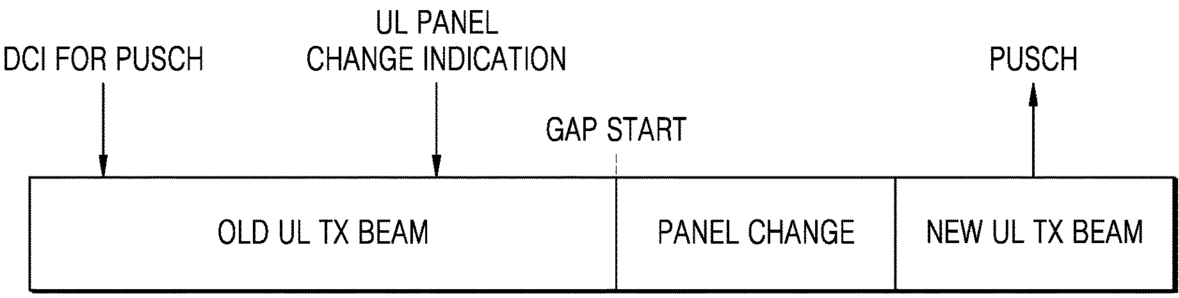
FIG. 13 illustrates an embodiment in which an uplink panel is changed after Downlink Control Information (DCI) required to transmit Physical Uplink Shared Channel (PUSCH) is received.

FIG. 13 illustrates an embodiment in which an uplink panel change is performed after DCI required for the PUSCH transmission is received.

Referring to FIG. 13, the UE may receive, from the BS, the PDCCH including the DCI for the PUSCH transmission. Then, the UE may receive an uplink panel change indication signal from the BS. The UE may perform the uplink panel change in response to the uplink panel change indication signal and transmit the PUSCH to the BS by forming a new transmission beam in a changed uplink panel.

When DCI corresponding to DCI format 0_1 or DCI format 0_2 is received, the UE may determine an SRS resource that is a basis of the transmission beam to be used by the PUSCH through an SRS Resource Indicator (SRI) in a field of the received DCI. In this case, when the PUSCH is scheduled using the DCI as described above, and when there is an uplink panel change gap between a DCI reception point in time and a PUSCH transmission point in time, the DCI may be invalid for a new transmission beam.

Accordingly, the UE may check whether the DCI, which is received before the uplink panel change is performed, is valid for the PUSCH transmission using the new transmission beam, and may determine a PUSCH transmission method according to the check result.

Figure 14:
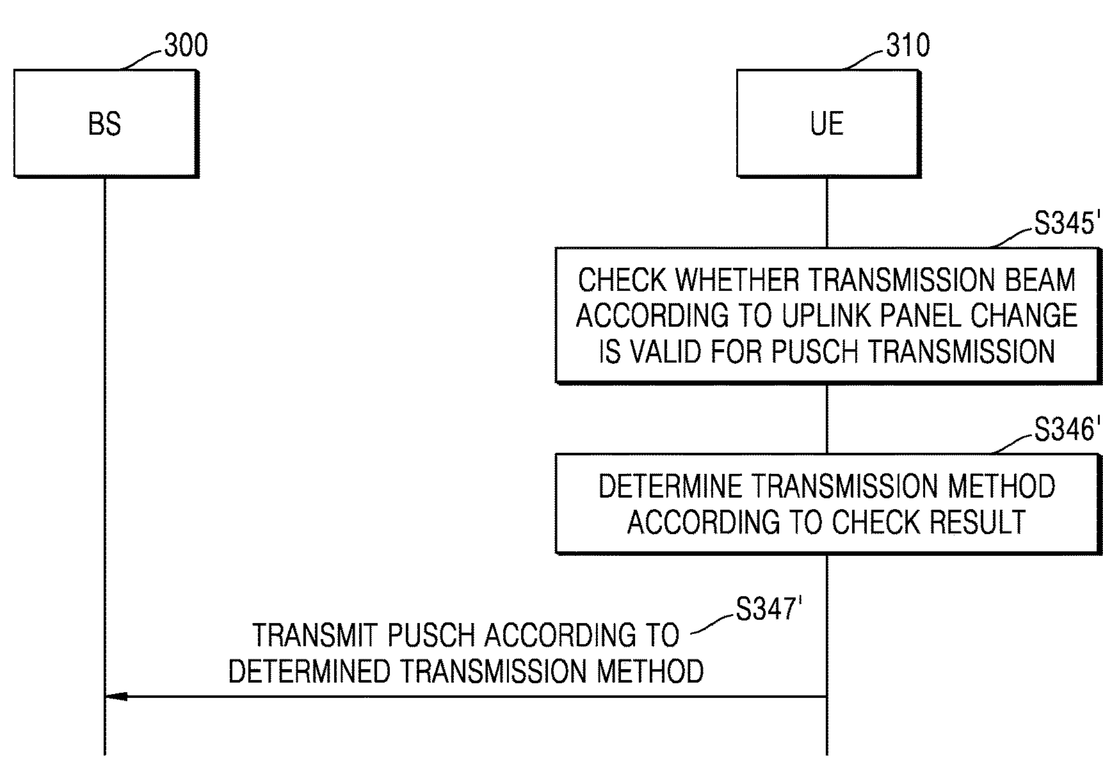
FIG. 14 is a flowchart of the operation method of a base station and user equipment according to the embodiment of FIG. 13.

FIG. 14 is a flowchart of the operation method of the BS 300 and the UE 310 in the embodiment of FIG. 13.

Referring to FIG. 14, in operation S345', the UE 310 may check whether the transmission beam according to the uplink panel change is valid for the PUSCH transmission. For example, the transmission beam may be based on the DCI received before the uplink panel change is performed. In an example embodiment, the UE 310 may check that a transmission beam, which is scheduled using an SRI or a Transmit Precoder Matrix Indicator (TPMI) based on the SRS that is invalid in the DCI format 0_1 or the DCI format 0_2, is invalid for the PUSCH transmission.

In operation S346', the UE 310 may determine the PUSCH transmission method according to the check result obtained in operation S345'. For example, when the scheduled transmission beam is invalid for the PUSCH transmission, the UE 310 may determine to drop the corresponding PUSCH or may determine to transmit the PUSCH by using, as the transmission beam, the reception beam used to receive the core set using the lowest index among the core sets for the PDCCH. As another example, when the scheduled transmission beam is valid for the PUSCH transmission, the UE 310 may determine to transmit the PUSCH by using the scheduled transmission beam.

In operation S347', the UE 310 may transmit the PUSCH according to the transmission method determined in operation S346'.

Figure 15:
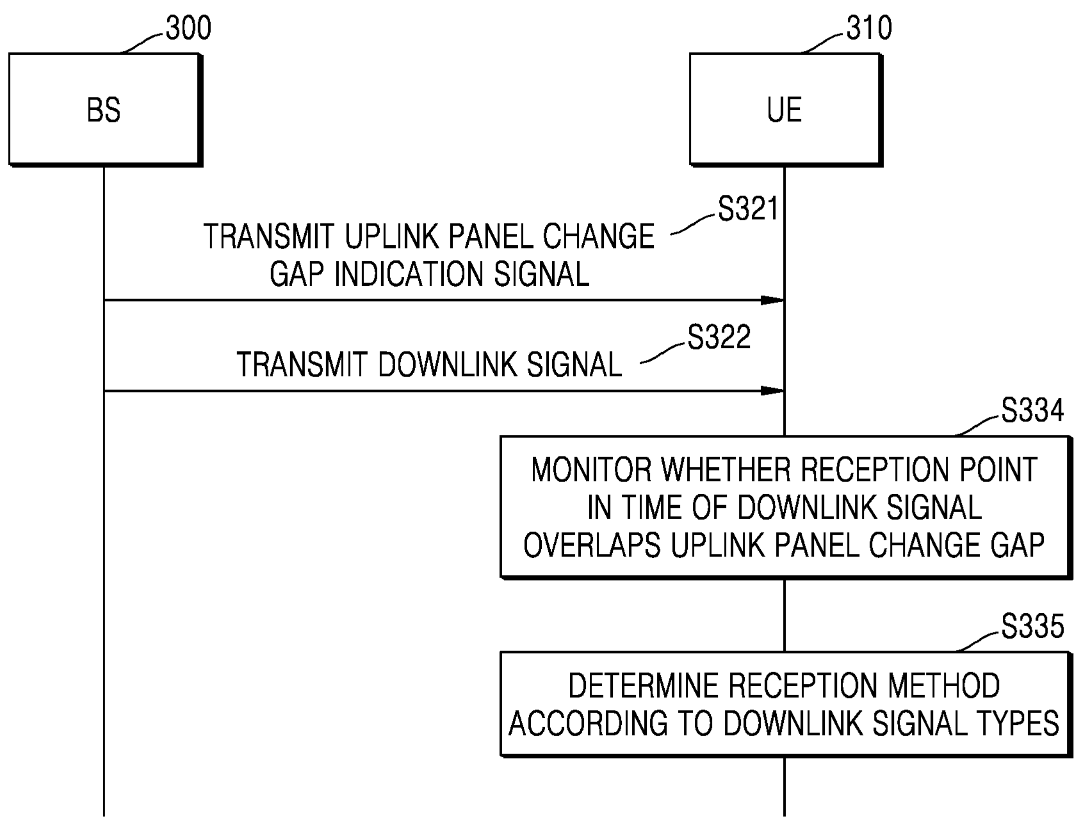
FIG. 15 is a flowchart of an operation method of a base station and user equipment, according to an example embodiment.

FIG. 15 is a flowchart of an operation method of the BS 300 and the UE 310, according to an example embodiment.

Referring to FIG. 15, in operation S321, the BS 300 may transmit the uplink panel change gap indication signal to the UE 310. Then, in operation S322, the BS 300 may transmit the downlink signal to the UE 310.

In operation S334, the UE 310 may monitor whether the reception point in time of the downlink signal overlaps a gap of the uplink panel change. In an example embodiment, the UE 310 may predict whether the reception point in time of the downlink signal overlaps the gap of the uplink panel change scheduled to be performed. That is, because the UE 310 may not easily receive the downlink signal in the gap of the uplink panel change, it may be important to monitor whether the gap overlaps the reception point in time of the downlink signal.

In operation S335, the UE 310 may determine a reception method according to downlink signal types. In an example embodiment, the UE 310 may assume that the downlink signal is not received or delay the uplink panel change, according to the downlink signal types.

Figure 16:
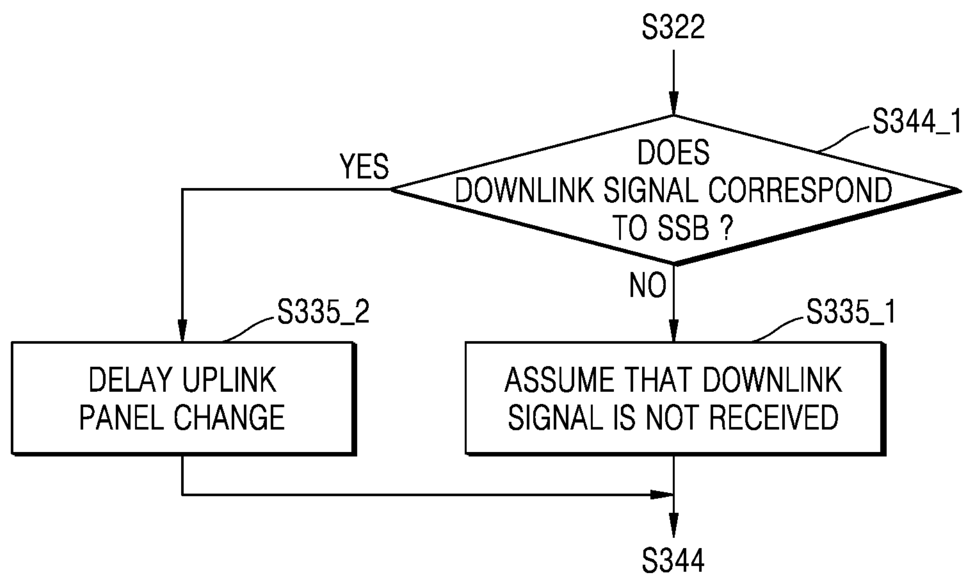
FIG. 16 is a flowchart for explaining operation S334 and operation S335 of FIG. 15 in detail.

FIG. 16 is a flowchart for explaining operation S334 and operation S335 of FIG. 15 in detail.

Referring to FIG. 16, in operation S344_1 after operation S322 of FIG. 15, the UE may determine whether the downlink signal is a Synchronization Signal Block (SSB). When a result from operation S344_1 is 'NO,' in operation S335_1 the UE may assume that the downlink signal is not received.

Otherwise, when the result from operation S344_1 is 'YES,' in operation S335_2 the UE may delay the uplink panel change not to make the downlink signal overlap the gap of the uplink panel change. To this end, the UE may preferentially receive the downlink signal.

Figure 17:
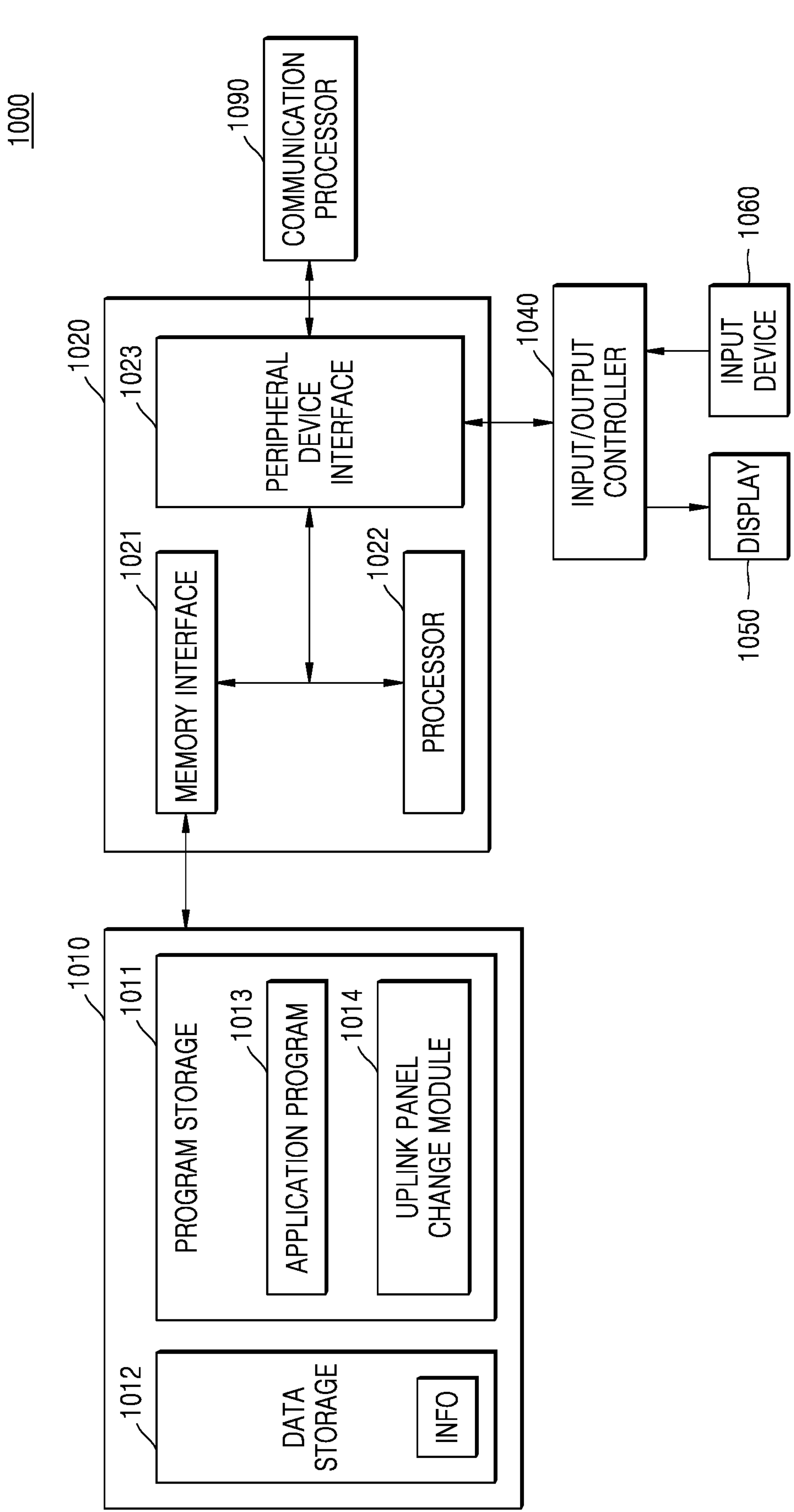
FIG. 17 is a block diagram of an electronic device according to an example embodiment.

FIG. 17 is a block diagram of an electronic device 1000 according to an example embodiment. The electronic device 1000 may be UE according to an example embodiment.

Referring to FIG. 17, the electronic device 1000 may include a memory 1010, a processor unit 1020, an input/output controller 1040, a display 1050, an input device 1060, and a communication processor 1090. Here, there may be a plurality of memories 1010. Each component is described below.

The memory 1010 may include a program storage 1011, in which a program for controlling an operation of the electronic device 1000 is stored, and a data storage 1012, in which data generated during the execution of the program is stored. The data storage 1012 may store data required for the execution of an application program 1013 and the operation of an uplink panel change module 1014. In an example embodiment, the data storage 1012 may store information INFO necessary to perform the uplink panel change according to example embodiments.

The program storage 1011 may include the application program 1013 and the uplink panel change module 1014. Here, the programs included in the program storage 1011 may be a collection of instructions and expressed as instruction sets. The application program 1013 may include program code to execute various applications working in the electronic device 1000. That is, the application program 1013 may include code (or commands) regarding various applications executed by a processor 1022. The uplink panel change module 1014 may include code (or commands) for performing the uplink panel change according to example embodiments.

In an example embodiment, the processor 1022 may execute the uplink panel change module 1014 to perform uplink panel change-related signaling with the BS by using a communication processor 1090 and may perform the uplink panel change based on the uplink panel change-related signaling.

The electronic device 1000 may include the communication processor 1090 that performs communication functions for voice communication and data communication.

A peripheral device interface 1023 may control the connection between the input/output controller 1040, the communication processor 1090, the processor 1022, and a memory interface 1021. The processor 1022 uses at least one software program and controls multiple BSs to provide corresponding services. In this case, the processor 1022 may provide a service corresponding to the program by executing at least one program stored in the memory 1010.

The input/output controller 1040 may provide an interface between the peripheral device interface 1023 and an input/output device such as the display 1050 and the input device 1060. The display 1050 displays state information, input text, a moving picture, a still picture, or the like. For example, the display 1050 may display information regarding an application program executed by the processor 1022.

The input device 1060 may provide the processor unit 1020 with input data generated according to the selection of the electronic device through the input/output controller 1040. In this case, the input device 1060 may include a keypad including at least one hardware button, a touchpad for detecting touch information, and the like. For example, the input device 1060 may provide touch information such as a touch, a touch movement, or a touch release detected by the touchpad to the processor 1022 through the input/output controller 1040.

Figure 18:
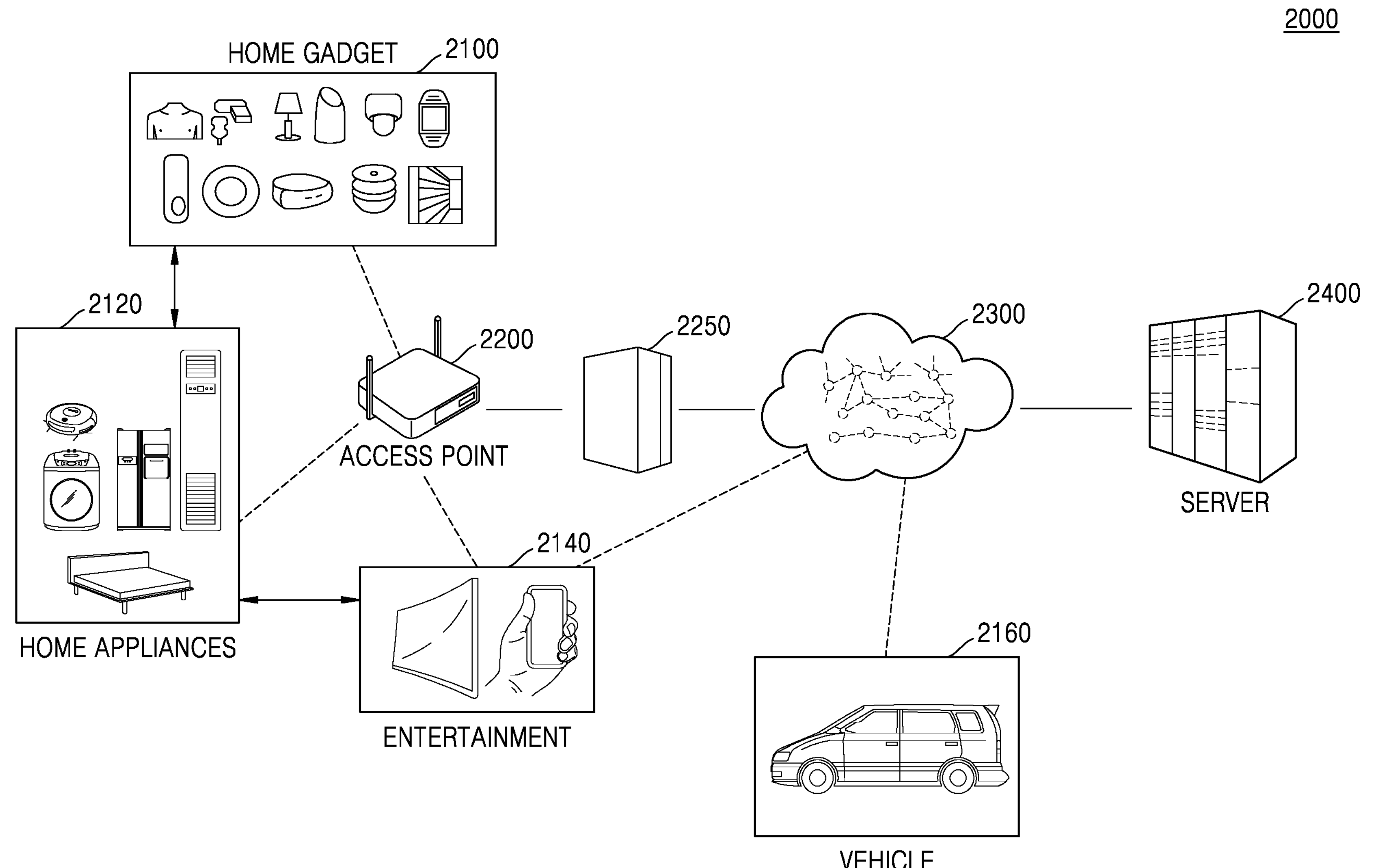
FIG. 18 is a conceptual view of an Internet of Things (IoT) network system to which an example embodiment is applied.

FIG. 18 is a conceptual view of an Internet of Things (IoT) network system 2000 according to an example embodiment.

Referring to FIG. 18, the IoT network system 2000 may include IoT devices 2100, 2120, 2140, and 2160, an access point 2200, a gateway 2250, a wireless network 2300, and a server 2400. The IoT may indicate a network between objects that uses wired/wireless communication.

Each of the IoT devices 2100, 2120, 2140, and 2160 may form a group according to features thereof. For example, the IoT devices may be grouped into a home gadget group 2100, a home appliance group 2120, an entertainment group 2140, a vehicle group 2160, and the like. The IoT devices 2100, 2120, and 2140 may be connected to a communication network or other IoT devices through the access point 2200. The access point 2200 may be embedded in one IoT device. The gateway 2250 may change a protocol to allow the access point 2200 to access an external wireless network. The IoT devices 2100, 2120, and 2140 may be connected to an external communication network through the gateway 2250. The wireless network 2300 may include the Internet and/or a public network. The IoT devices 2100, 2120, 2140, and 2160 may be connected to a server 2400 providing a certain service through the wireless network 2300, and a user may use the service by using at least one of the IoT devices 2100, 2120, 2140, and 2160. The IoT devices 2100, 2120, 2140, and 2160 may each include a plurality of antenna panels and may perform the uplink panel change according to example embodiments.

Various changes in form and details of the embodiments may be made without departing from the spirit and scope of the following claims.

What is claimed is:

1. A user equipment configured to communicate with a device, the user equipment comprising:

a first antenna panel;

a second antenna panel; and a controller configured to control the first antenna panel and the second antenna panel, wherein the controller is configured to perform an uplink panel change for turning on the second antenna panel to change a first transmission beam of the first antenna panel, which is on, to a second transmission beam of the second antenna panel, which is off, according to uplink panel change-related signaling with the device, wherein the uplink panel change-related signaling comprises:

transmitting, by the controller, panel-related performance information about the user equipment to the device; and receiving, by the controller, an uplink panel change signal corresponding to the panel-related performance information from the device, wherein the panel-related performance information comprises whether a gap for the uplink panel change is generated and a length of the gap, which depend on uplink panel change performance of the user equipment, wherein the uplink panel change signal comprises gap-related information for the uplink panel change, and wherein the gap-related information is set based on the panel-related performance information.

2. The user equipment of claim 1, wherein the panel-related performance information further comprises at least one of whether there is a need for the uplink panel change by the user equipment, a number of antenna panels of the user equipment, and a maximum number of antenna panels that are simultaneously usable.

3. The user equipment of claim 1, wherein the gap-related information comprises at least one of a gap start point in time, a gap termination point in time, and a length of a gap.

4. The user equipment of claim 1, wherein the uplink panel change-related signaling comprises transmitting, by the controller, a notification signal to the device, wherein the notification signal is a signal notifying a change of a transmission beam.

5. The user equipment of claim 4, wherein the notification signal comprises at least one of a first signal indicating the second transmission beam changed from the first transmission beam, and a second signal indicating a termination point in time of the change.

6. The user equipment of claim 1, wherein the uplink panel change-related signaling comprises:

receiving an uplink panel change gap indication signal from the device; and transmitting, by the controller, an ACK signal or a NACK signal in response to the uplink panel change gap indication signal.

7. The user equipment of claim 6, wherein the controller is further configured to start the uplink panel change after a certain period of time has passed from a point in time when the ACK signal is transmitted.

8. The user equipment of claim 1, wherein, when a gap for the uplink panel change overlaps a point in time when an uplink signal is transmitted, the controller is further configured to transmit the uplink signal to the device according to a transmission method determined according to a type of the uplink signal.

9. The user equipment of claim 8, wherein the controller is further configured to:

transmit the uplink signal in a next transmission point in time based on whether a channel including the uplink signal is a Physical Uplink Control Channel (PUCCH); and drop the uplink signal when the channel including the uplink signal is not the PUCCH.

10. The user equipment of claim 1, wherein the first transmission beam and the second transmission beam are configured to transmit first data on a Physical Uplink Shared Channel (PUSCH), and wherein the controller is further configured to check whether the second transmission beam is valid for PUCCH transmission and transmit the first data on the PUCCH according to a transmission method that is based on a result of the checking.

11. The user equipment of claim 10, wherein the controller is further configured to:

transmit second data on the PUCCH using the second transmission beam based on a reference signal corresponding to the first transmission beam being valid for the second transmission beam; and drop the second data on the PUCCH when the reference signal is invalid for the second transmission beam.

12. The user equipment of claim 10, wherein the controller is further configured to:

transmit second data on the PUCCH using the second transmission beam based on a reference signal corresponding to the first transmission beam being valid for the second transmission beam;

determine a reception beam, which is used to receive any one of a plurality of CORESETs for a Physical Downlink Control Channel (PDCCH), as a third transmission beam based on the reference signal being invalid for the second transmission beam and a format condition regarding the PUCCH being satisfied, and transmit third data on the PUCCH using the third transmission beam; and determine to drop the third data on the PUCCH when the format condition regarding the PUCCH is not satisfied.

13. The user equipment of claim 12, wherein the third transmission beam is used to receive a CORESET using a lowest index among the plurality of CORESETs.

14. A communication system comprising:

a user equipment comprising a plurality of antenna panels; and a device configured to communicate with the user equipment, wherein the user equipment is configured to:

perform uplink panel change-related signaling with the device; and perform an uplink panel change for turning on at least one second antenna panel to change at least one first antenna panel, which is on from among the plurality of antenna panels, to the at least one second antenna panel, which is off from among the plurality of antenna panels, based on the uplink panel change-related signaling, wherein the uplink panel change-related signaling comprises:

receiving, by the device, panel-related performance information from the user equipment; and transmitting, by the device, an uplink panel change signal, which is generated based on the panel-related performance information, to the user equipment, wherein the panel-related performance information comprises whether a gap for the uplink panel change is generated and a length of the gap, which depend on uplink panel change performance of the user equipment, wherein the uplink panel change signal comprises gap-related information for the uplink panel change, and wherein the gap-related information is set based on the panel related performance information.

15. The communication system of claim 14, wherein the device is further configured to:

monitor whether the uplink panel change is required based on a transmission beam for transmitting a downlink signal to the user equipment being changed; and generate the uplink panel change signal based on the uplink panel change being required.

16. The communication system of claim 14, wherein the uplink panel change-related signaling comprises:

receiving, by the device, a notification signal for notifying a change of a transmission beam from the user equipment; and checking, by the device, whether the transmission beam of the device is changed, according to the notification signal.

17. The communication system of claim 14, wherein the uplink panel change-related signaling comprises transmitting, by the device, an uplink panel change signal of a Component Carrier (CC) group unit to the user equipment, and wherein the user equipment is further configured to perform the uplink panel change in the CC group unit in response to the uplink panel change signal.

18. An operation method of a user equipment configured to communicate with a device by selectively using at least one of a plurality of antenna panels, the operation method comprising:

performing uplink panel change-related signaling with the device; and performing an uplink panel change for turning on at least one second antenna panel, which is off from among the plurality of antenna panels, to change at least one first antenna panel, which is on from among the plurality of antenna panels, to the at least one second antenna panel, based on the uplink panel change-related signaling, wherein the uplink panel change-related signaling comprises:

transmitting, by a controller, panel-related performance information about the user equipment to the device; and receiving, by the controller, an uplink panel change signal corresponding to the panel-related performance information from the device, wherein the panel-related performance information comprises whether a gap for the uplink panel change is generated and a length of the gap, which depend on uplink panel change performance of the user equipment, wherein the uplink panel change signal comprises gap-related information for the uplink panel change, and wherein the gap-related information is set based on the panel-related performance information.

* * * * *